US010719503B1

(12) United States Patent
Bar Oz et al.

(10) Patent No.: US 10,719,503 B1
(45) Date of Patent: Jul. 21, 2020

(54) INTERFACE FOR SUPPORTING INTEGRATION WITH CLOUD-BASED SERVICE PROVIDERS

(71) Applicant: ServiceNow, Inc., Santa Clara, CA (US)

(72) Inventors: Tom Bar Oz, Herzliya (IL); Robert Bitterfeld, petach tikva (IL); Boris Erblat, Tel Aviv (IL); Aviya Aron, Shafir (IL); Asaf Garty, Sdei Hemed (IL); Daniel Badyan, Tel Aviv (IL); Hail Tal, Kohav Yair (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/402,045

(22) Filed: May 2, 2019

(51) Int. Cl.
| | |
|---|---|
| *G06F 16/23* | (2019.01) |
| *H04L 29/08* | (2006.01) |
| *H04L 29/06* | (2006.01) |
| *G06F 16/27* | (2019.01) |
| *G06F 16/215* | (2019.01) |
| *G06F 16/21* | (2019.01) |
| *H04N 21/21* | (2011.01) |

(52) U.S. Cl.
CPC ........ *G06F 16/2365* (2019.01); *G06F 16/215* (2019.01); *G06F 16/219* (2019.01); *G06F 16/27* (2019.01); *H04L 29/06* (2013.01); *H04L 67/025* (2013.01); *H04L 67/10* (2013.01); *H04L 67/40* (2013.01); *H04N 21/21* (2013.01)

(58) Field of Classification Search
CPC .... G06F 16/2365; G06F 16/27; G06F 16/219; G06F 16/215; H04L 67/025; H04L 67/10; H04L 67/40; H04N 21/21
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |

(Continued)

OTHER PUBLICATIONS

Extended European Search Report for European Patent Application No. 19305183.0 dated Sep. 30, 2019; 7 pgs.

*Primary Examiner* — Todd L Barker
(74) *Attorney, Agent, or Firm* — Fletcher Yoder PC

(57) ABSTRACT

An example system includes persistent storage and a discovery application configured to perform operations including obtaining a uniform resource locator (URL) that addresses a function of an application programming interface (API) provided by a remote computing system of remote computing systems that provide computing resources. The function returns attributes of computing resources specified by the URL. The operations additionally include generating (i) a system-specific portion of a request that invokes execution of the function and (ii) a system-invariant portion of the request. The system-specific portion adheres to first rules adopted by the remote computing system for interacting with the API. The system-invariant portion adheres to second rules adopted by each of the remote computing systems for interacting with respective APIs thereof. The operations yet further include transmitting the request to the remote computing system, receiving therefrom a response containing the attributes, and storing, in the persistent storage, the attributes.

18 Claims, 13 Drawing Sheets

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,877,783 B1 | 1/2011 | Cline |
| 7,925,981 B2 | 4/2011 | Pourheidari |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,082,491 B1 * | 12/2011 | Abdelaziz .............. G06F 9/465 715/234 |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,852,165 B2 | 12/2017 | Morozov |
| 9,967,162 B2 | 5/2018 | Spinelli |
| 10,002,203 B2 | 6/2018 | George |
| 2002/0194336 A1 | 12/2002 | Kett et al. |
| 2005/0043940 A1 * | 2/2005 | Elder ................ G06F 16/24522 704/9 |
| 2006/0047757 A1 * | 3/2006 | Geller ..................... H04L 67/06 709/206 |
| 2012/0198073 A1 | 8/2012 | Srikanth et al. |
| 2014/0372431 A1 * | 12/2014 | Branson .................. G06F 9/46 707/736 |
| 2015/0195121 A1 | 7/2015 | Bragstad et al. |
| 2016/0085862 A1 | 3/2016 | Baldwin et al. |
| 2017/0289053 A1 * | 10/2017 | Byelov .................. H04L 47/25 |
| 2018/0121245 A1 | 5/2018 | Wagner et al. |
| 2018/0351851 A1 * | 12/2018 | Parthasarathy ......... H04L 45/20 |
| 2018/0374020 A1 * | 12/2018 | Ahani .............. G06Q 10/06314 |
| 2019/0095516 A1 * | 3/2019 | Srinivasan ............ H04L 63/102 |
| 2019/0205153 A1 * | 7/2019 | Niestemski ......... H04L 41/0896 |
| 2019/0386877 A1 * | 12/2019 | Vaidya ................ H04L 41/0806 |

* cited by examiner

700. GET /RESOURCE_PATH_1?QUERY_PARAM_1=VALUE_1 HTTP/1.1
701. HOST: REMOTE_SYSTEM_1
702. AUTHORIZATION: BASIC ZXhHbXBsZV91c2VyBmFtZTPLEGFTCGxLX3BHc3N3B3JK

FIG. 7A

703. GET /RESOURCE_PATH_2?QUERY_PARAM_2=VALUE_2 HTTP/1.1
704. HOST: REMOTE_SYSTEM_2
705. AUTHORIZATION: BEARER
706. C4DKFOMLBICAWEYJs8DO1HQIYGQA_AMTAHB75Y24AWDGWKHAUFEG8K97K6CQA7AKH_BWYAB0IZAD8CA1PV2OH0KY2WSRGTWBC
707. BPEQESVQ

FIG. 7B

708. GET /RESOURCE_PATH_3?QUERY_PARAM_3=VALUE_3&API_KEY=API_KEY_VALUE HTTP/1.1
709. HOST: REMOTE_SYSTEM_3

FIG. 7C

INTERFACE FOR SUPPORTING INTEGRATION WITH CLOUD-BASED SERVICE PROVIDERS

CROSS-REFERENCE TO RELATED APPLICATION

This application claims priority to European patent application No. 19305483.0, filed Apr. 12, 2019, which is hereby incorporated by reference in its entirety.

BACKGROUND

Computing devices, software applications, storage structures, and other computing resources that make up a computer network may be discovered and the relationships therebetween may be mapped. These elements of the computer network, as well as the relationships, may be stored as configuration items in a database. The stored configuration items may later be retrieved and used to generate a visualization of a state or arrangement of these elements within the computer network. Discovering computing resource involves developing software processes that are capable of gathering the information needed for detection, classification, and/or identification of these computing resources.

SUMMARY

A managed network may utilize computing resources provided by one or more remote computing systems. For example, the remote computing systems may provide cloud-based computing environments, accessed by way of the Internet or another wide-area network, that the managed network utilizes to store data and host software applications. Discovery and mapping of such computing resources by a discovery application may involve utilizing application programming interfaces (APIs) provided by the remote computing systems to obtain various attributes of the computing resources. For example, one or more functions of an API provided by a particular remote computing system may be used to determine the attributes of the virtual machines, load balancers, storage volumes, and network components that are assigned to the managed network and that form the computing environment utilized thereby.

In some cases, the APIs may be accessed by transmitting a request (e.g., an hypertext transfer protocol (HTTP)) request to one or more uniform resource locators (URLs) associated therewith. For example, each function of the API may be invoked by a corresponding URL that specifies the computing resources and the attributes thereof that the function is requested to provide. An output of the function may be transmitted to the discovery application in a response (e.g., an HTTP response) to the request. The APIs may be representational state transfer (REST) APIs, service oriented architecture (SOAP) APIs, and/or remote procedure call (RPC) APIs, and may thus operate according to a shared set of standards or de facto procedures. Notably, other types of APIs are possible.

Many rules associated with interacting with the APIs may be shared across the different remote computing systems. Such rules may be referred to as system-invariant. Some rules for interacting with the APIs may, however, vary across the different remote computing systems. That is, some remote computing systems may have system-specific rules for interacting with their respective APIs. A discovery software application may be configured to take advantage of the system-invariant rules and the system-specific rules when defining discovery and mapping patterns for the remote computing systems.

Namely, the discovery application may provide a user interface that allows discovery and mapping patterns to be defined for each of the different remote computing systems. The discovery application may include a system-invariant module configured to carry out operations that are shared among the different remote computing systems involved in interacting with the APIs. The discovery application may also include, for each respective remote computing system of the different remote computing systems for which discovery and mapping is supported, a system-specific module configured to carry out operations specific to the API provided by the respective remote computing system. Accordingly, supporting discovery and mapping of a new remote computing system may involve adding a new system-specific module that accounts for the specific rules adhered to by the new remote computing system, while reusing many or all aspects of the system-invariant module. Such an approach makes it easier for discovery pattern designers, discovery pattern research and development roles, and discovery pattern tool developers to support discovery of new or additional remote computing systems.

In order to define a discovery and mapping pattern, the discovery application may obtain (e.g., by way of the user interface) a service identifier that allows access to the particular remote computing system sought to be discovered and mapped. The service identifier may include or be associated with a service account and/or one or more credentials assigned to the managed network carrying out the discovery and mapping operations. The service identifier may define the context for the discovery and mapping pattern. That is, the service identifier may indicate that the pattern is targeted at the particular remote computing system, rather than a different one of the remote computing systems. Thus, the service identifier may indicate to the discovery application which system-specific module is to be used in interacting with the API of the particular remote computing system.

The discovery application may also obtain a URL that addresses a specific function of the API provided by the particular remote computing system. The URL may identify the API, the function thereof, and one or more of a plurality of input parameters of the function by way of URL resource path parameter and/or URL query parameters. The URL may be obtained by the discovery application by way of a corresponding input field of the user interface provided by the discovery application.

The discovery application may be configured to generate a request that invokes execution of the function of the API addressed by the URL. This request may include at least two portions. The first portion may be a system-specific portion generated by the system-specific module. This system-specific portion may adhere to the system-specific rules adopted by the particular remote computing system for interacting with its API. The second portion may be a system-invariant portion generated by the system-invariant module. This system-invariant portion may adhere to the system-invariant rules generally adopted by each of the remote computing systems for interacting with the APIs thereof. Notably, in spite of the system-specific differences among different remote computing systems, the user experience provided by the discovery application may be uniform across each of the different remote computing systems. Thus, an end-user of the discovery application might not need to be familiar with the specifics of each remote computing system to define a discovery and mapping pattern therefor.

The system-specific rules may, for example, define a manner in which the particular remote computing system handles authentication and/or authorization. That is, the system-specific rules may indicate whether the particular remote computing system uses basic HTTP authentication (e.g., where a username and password is provided to the API as part of each request transmitted thereto), an API key (e.g., where a unique value is assigned to the service identifier and provided as part of each request to the API), bearer authentication (e.g., open authorization standard (OAuth 2.0)), or another authorization and/or authentication standard or combination thereof.

The system-specific rules may additionally or alternatively define the manner in which the particular remote computing system handles pagination. Namely, when the size of the output of the API function exceeds a maximum size of the response, the output may be divided into a plurality of different sections, portions, or pages. In some cases, the discovery application may request the entirety of this output to be transmitted in different responses. Alternatively, in some cases, the discovery application may request a specific subset of the output, rather than the entirety thereof, to be transmitted. Different remote computing systems may provide different mechanisms for pagination of the function output.

As one example, an initial response from the API may include an additional URL to which another request is to be transmitted to obtain a subsequent page of the function output. Similarly, the response to this another request may include a further URL that addresses the next page of the output, and so on, until the last page of the output is obtained. In some implementations of such a pagination process, a particular page of the results might not be individually obtainable. Thus, the discovery application may receive and parse the output in the sequential pages until the entire output of the function or a portion of interest thereof is received. In another example, the API may indicate in the response the maximum number of results generated by the function. The discovery application may thus be able to requests, for example, results 5 to 20 of a total of 50 results by including, in a subsequent request to the API, parameters that indicate the specific results that the API is to transmit in the response. Other pagination processes are possible.

The system-specific rules may further define the manner in which geographically-distributed computing resources of the particular remote computing system are discoverable. The system-specific rules may define, for example, the geographic regions provided by a particular remote computing system, the names of the respective geographic regions, and the procedure for discovering resources in each geographic region. Rather than iterating through each geographic region manually (e.g., by way of multiple different actions of a discovery pattern), the discovery application may be configured to iterate through multiple geographic region automatically on the basis of a single URL that includes therein a particular string, flag, or identifier. For example, when the URL contains therein the region-invariant identifier "{REGION}", the discovery application may replace this identifier with the specific name of a geographic region provided by a remote computing system in which computing resources are to be identified. This may be done for each available geographic region or each geographic region known or expected to have therein computing resources dedicated to the managed network.

Additional parameters to be included in the request transmitted to the API may be provided by way of corresponding input fields of the user interface provided by the discovery application. These additional input parameters may be transmitted to the API as HTTP headers, an indication of an HTTP method, HTTP cookies, and/or HTTP body parameters. A mapping between the input fields of the user interface and such transfer protocol parameters may be defined by the system-invariant rules.

A discovery and mapping pattern may be made up of a plurality of different actions or steps. These actions may be connected with one another such that the outputs of one action may serve as the inputs of another action. For example, identifiers of particular computing resources discovered by a first action may be used by a subsequent action to obtain additional attributes of these computing resources and their relationships with other computing resources. The relationships may indicate, for example, that a first computing resource uses storage provided by a second computing resource, that the first computing resource uses network infrastructure provided by the second computing resource, and/or that the first computing resource and the second computing resource are each part of a pool of devices associated with a particular load balancer, among other possibilities. Such relationships may be determined based on the attributes associated with the computing resources.

Accordingly, the discovery application may be used to define a plurality of output variables of an action and a mapping between these output variables and a plurality of values contained in the response obtained by the action from the API. When the response is received, the discovery application may parse the response to identify therein the values, assign the values to the corresponding variables, and provide these variables as input to one or more subsequent actions in the discovery pattern.

The system-invariant rules may define one or more processes for parsing the response of the API to extract therefrom the values of the outputs of the function and assigning the values to the corresponding variables. Namely, the output values of the function may be arranged in one or more of a predetermined number of data formats supported by the transfer protocol. Thus, a different parsing process may be used depending on the data formats (e.g., Extensible Markup Language (XML) or JavaScript Object Notation (JSON)) indicated to be used by a particular response.

Accordingly, a first example embodiment may involve a system that includes persistent storage disposed within a remote network management platform. The persistent storage is configured to store data on behalf of a managed network. One or more remote computing systems provide computing resources to the managed network. The system also includes a discovery application configured to perform operations. The operations include obtaining a service identifier that allows access to a particular remote computing system of the one or more remote computing systems. The service identifier is associated with the managed network. The operations also include obtaining a URL that addresses a function of an API provided by the particular remote computing system. The function is configured to return attributes of computing resources specified by the URL. The operations additionally include generating, based on the service identifier, a system-specific portion of a request that invokes execution of the function of the API. The system-specific portion of the request adheres to first rules adopted by the particular remote computing system for interacting with the API. The operations further include generating a system-invariant portion of the request. The system-invariant portion of the request adheres to second rules adopted by each of the one or more remote computing systems for interacting with respective APIs thereof. The operations yet further include transmitting the request to the particular remote computing system, receiving, from the particular remote computing system, a response to the request containing the attributes of the computing resources specified by the URL, and storing, in the persistent storage, the attributes of the computing resources as one or more configuration items.

A second example embodiment may involve obtaining, by a discovery application, a service identifier that allows access to a particular remote computing system of one or more remote computing systems that provide computing resources to a managed network. The service identifier is associated with the managed network. The second embodiment also includes obtaining, by the discovery application, a URL that addresses a function of an API provided by the particular remote computing system. The function is configured to return attributes of computing resources specified by the URL. The second embodiment additionally includes generating, by the discovery application and based on the service identifier, a system-specific portion of a request that invokes execution of the function of the API. The system-specific portion of the request adheres to first rules adopted by the particular remote computing system for interacting with the API. The second embodiment further includes generating, by the discovery application, a system-invariant portion of the request. The system-invariant portion of the request adheres to second rules adopted by each of the one or more remote computing systems for interacting with respective APIs thereof. The second embodiment yet further includes transmitting, by the discovery application, the request to the particular remote computing system, receiving, by the discovery application and from the particular remote computing system, a response to the request containing the attributes of the computing resources specified by the URL, and storing the attributes of the computing resources as one or more configuration items in persistent storage disposed within a remote network management platform. The persistent storage is configured to store data on behalf of the managed network.

In a third example embodiment, an article of manufacture may include a non-transitory computer-readable medium, having stored thereon program instructions that, upon execution by a computing system, cause the computing system to perform operations in accordance with the first or second example embodiments.

In a fourth example embodiment, a computing system may include at least one processor, as well as memory and program instructions. The program instructions may be stored in the memory, and upon execution by the at least one processor, cause the computing system to perform operations in accordance with the first or second example embodiments.

In a fifth example embodiment, a system may include various means for carrying out each of the operations of the first or second example embodiments.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 7A, 7B, and 7C depict requests with authentication parameters, in accordance with example embodiments.

DETAILED DESCRIPTION

Figure 1:
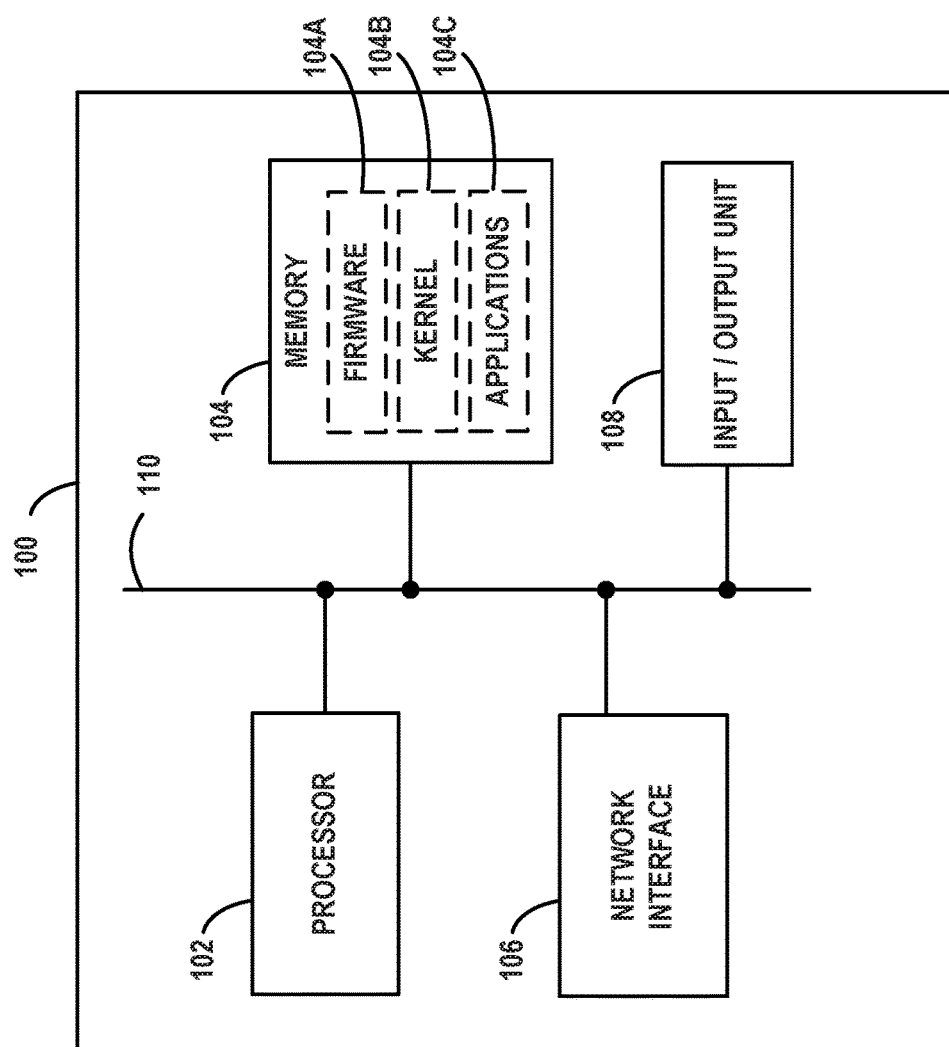
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
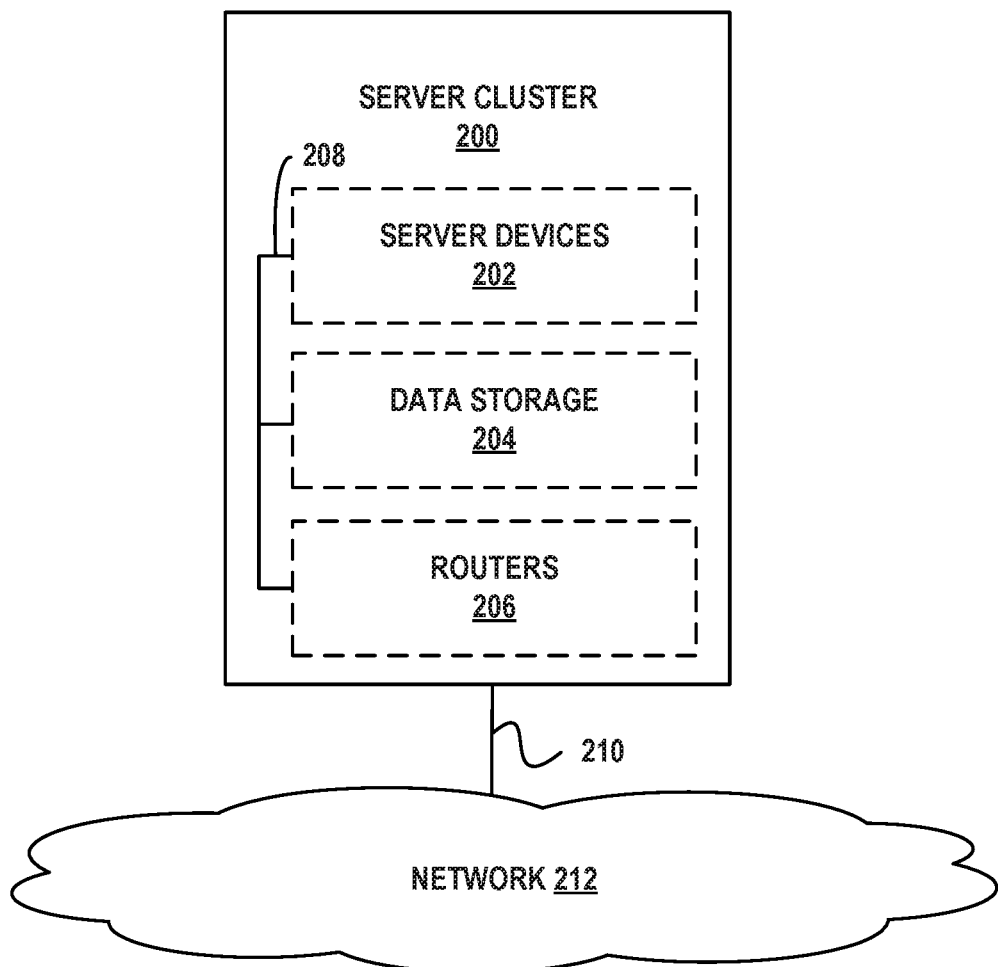
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
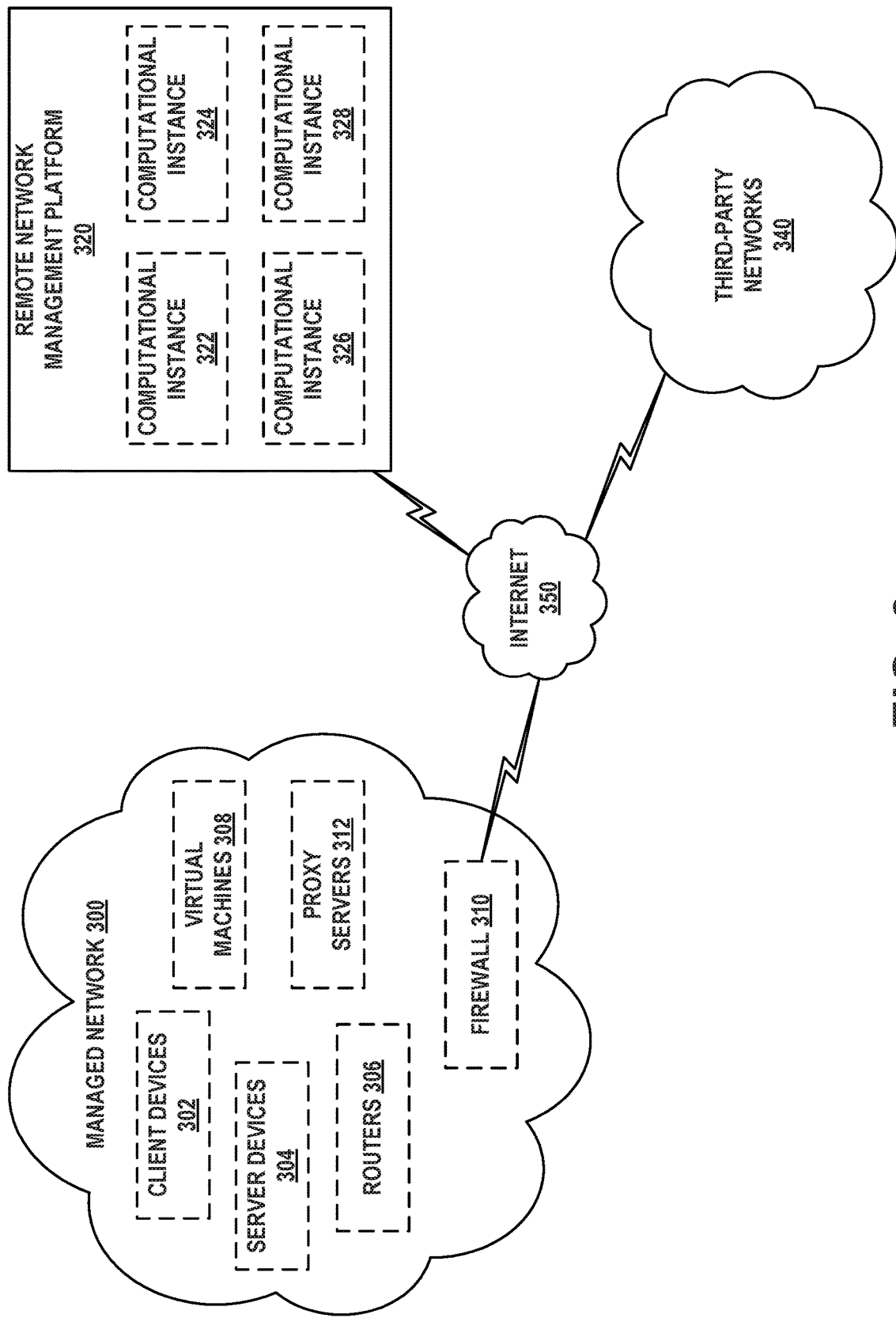
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
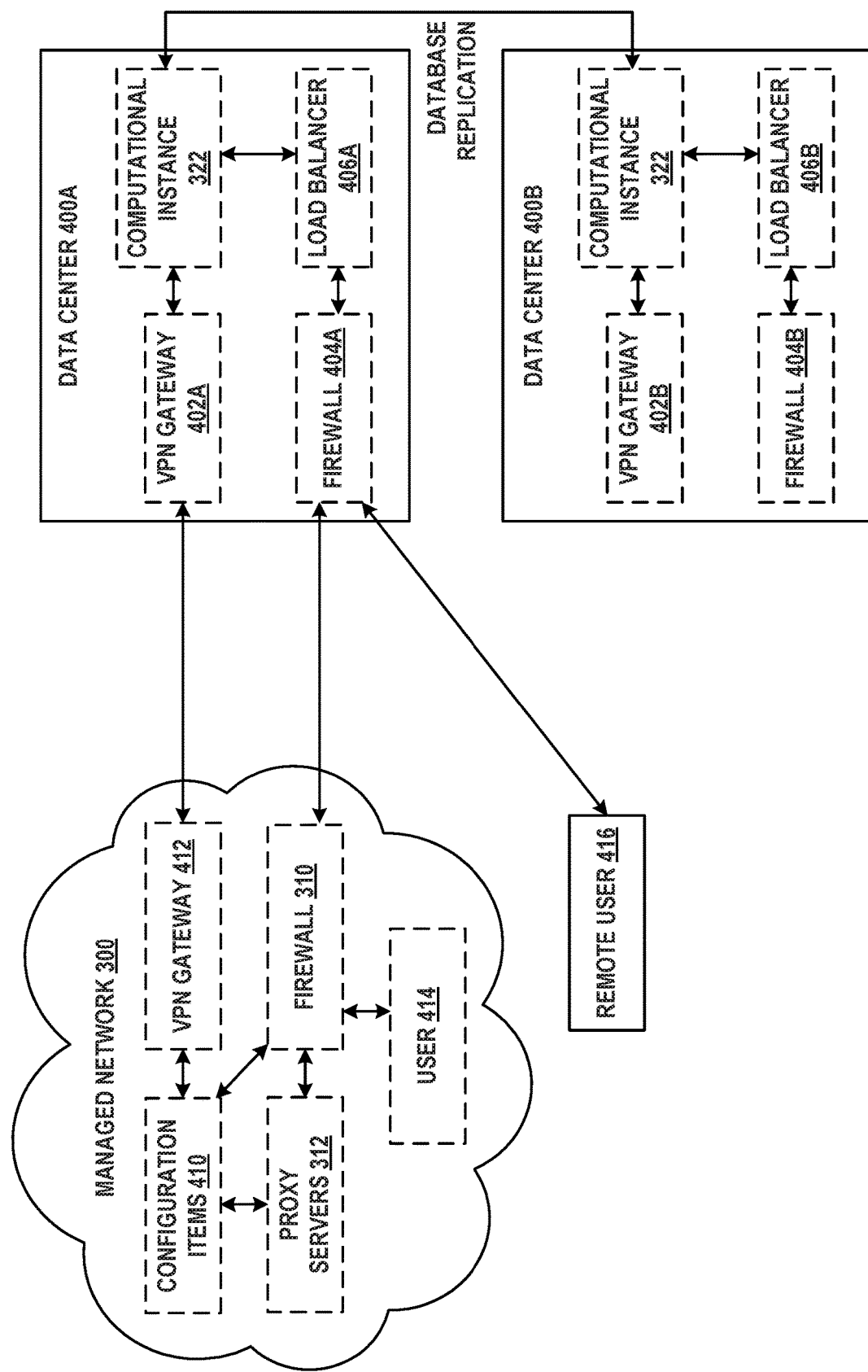
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
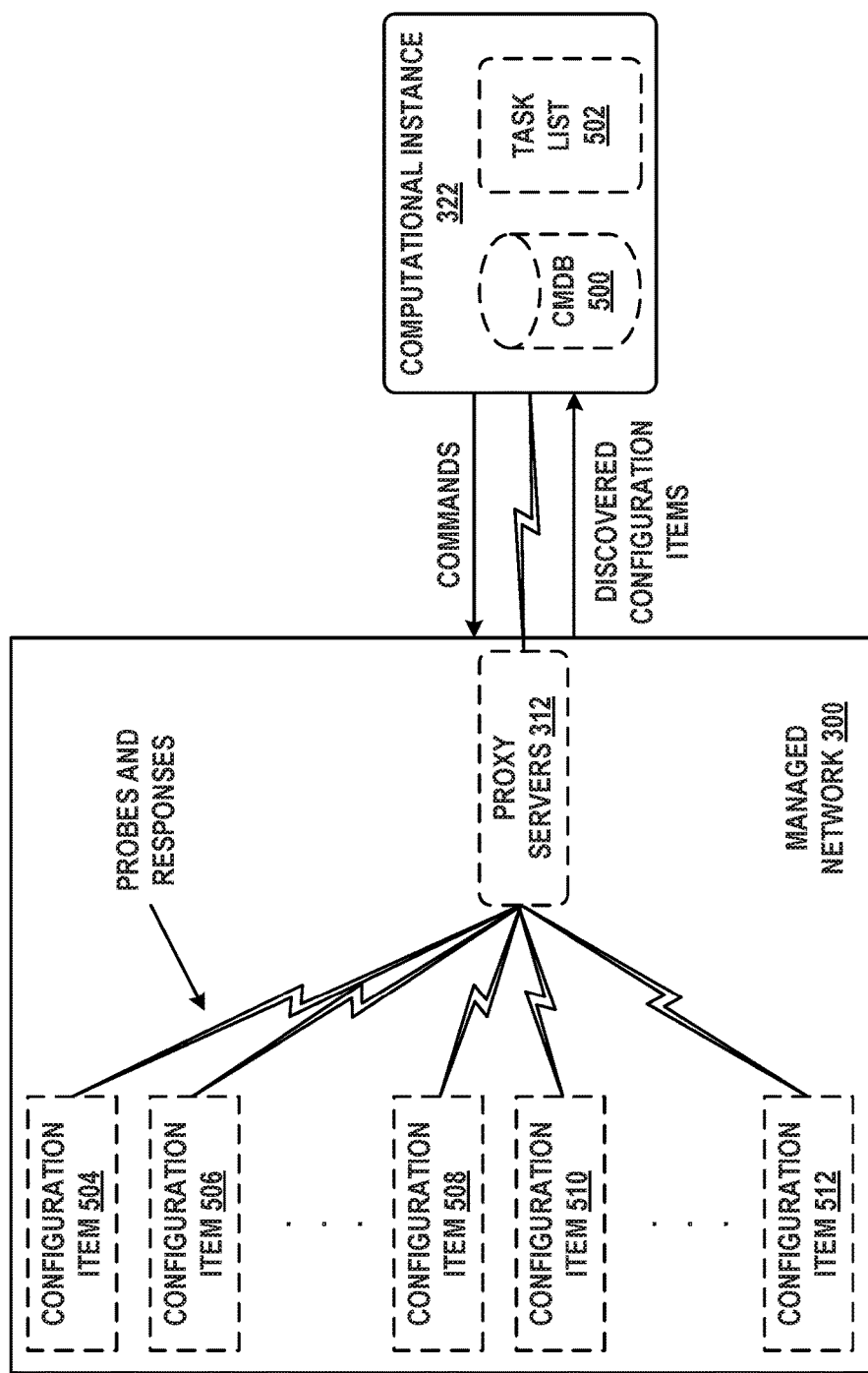
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
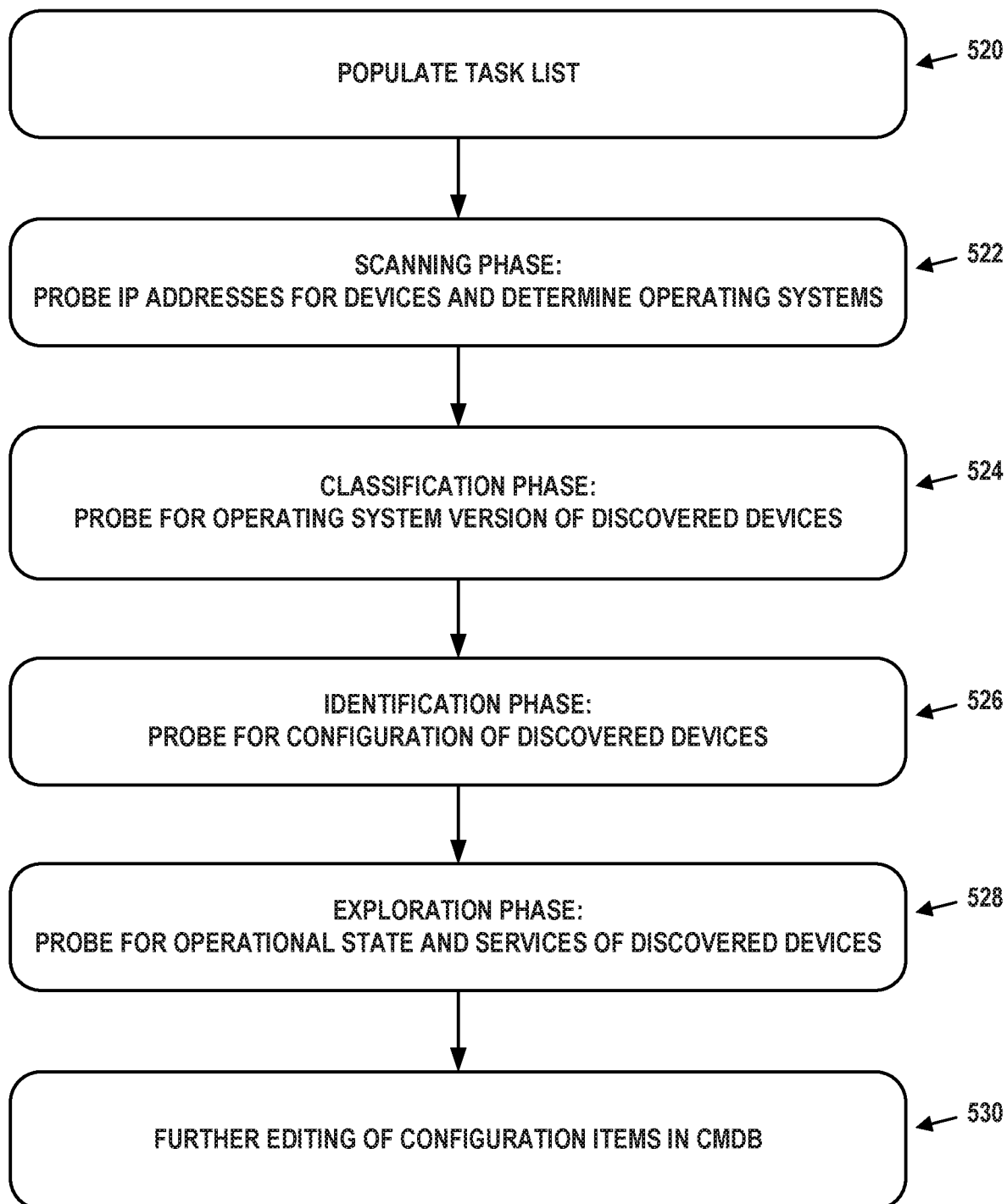
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Discovery Application

A managed network may utilize computing resources provided by one or more remote computing systems. The remote computing systems may include cloud computing environments such as AMAZON WEB SERVICES®, MICROSOFT® AZURE®, GOOGLE CLOUD PLATFORM®, or IBM CLOUD®, among other possibilities. The computing resources provided by the remote computing systems may be discoverable by way of one or more APIs provided by these remote computing systems. Specifically, the APIs may provide data indicative of the specific computing resources dedicated or assigned to the managed network, as well as the attributes of each of these computing resources. This data may then be used to generate a map of the computing resources utilized by the managed network.

The rules (e.g., standards, conventions, styles, or design choices) according to which the respective API of each remote computing system is implemented and operates may vary. For example, the APIs may be REST APIs and may thus adhere to certain rules associated with the REST architectural style. However, the REST architectural style allows for some variation in how certain features or behaviors of the API are implemented, leading to differences even among APIs that share a common architectural style or standard. Alternatively or additionally, some APIs may deviate from the REST architectural style in some respects, thus resulting in further potential differences. Other causes of the variation are possible. Accordingly, each respective API may operate according to (i) system-invariant rules that the respective API shares with the APIs of other remote computing systems and (ii) system-specific rules that are unique or specific to the respective API.

Rather than developing an independent software application specific to each API provided by the remote computing systems, a single discovery application may be configured to facilitate the discovery and mapping of a plurality of different remote computing systems. In particular, a user may be able to use this single discovery application for discovering and mapping the plurality of different remote computing systems in a system-independent fashion, without having to learn, understand, and/or implement any of the system-specific rules.

Figure 6:
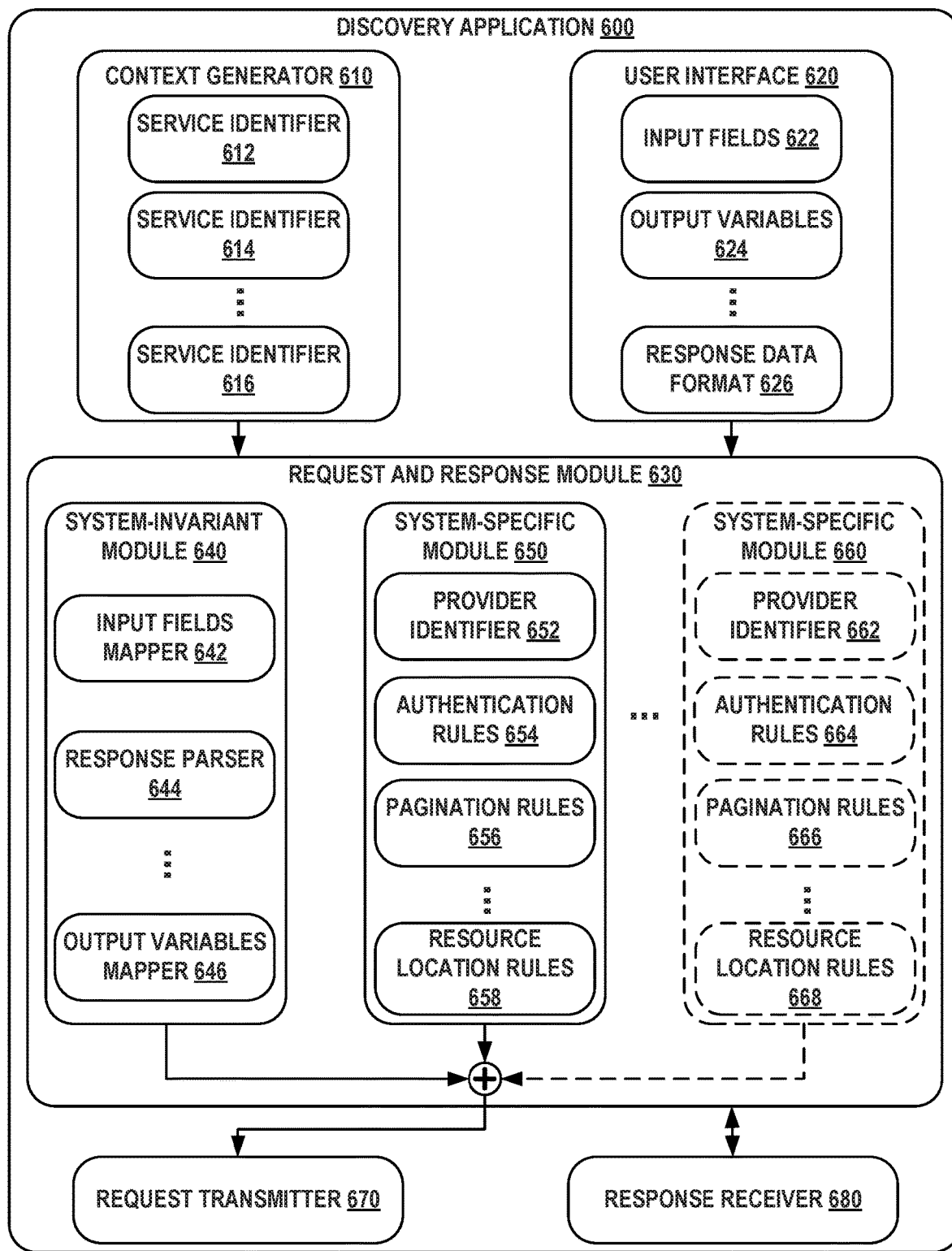
FIG. 6 illustrates a schematic drawing of a discovery application, in accordance with example embodiments.

To that end, FIG. 6 illustrates discovery application 600, which includes context generator 610, user interface 620, request and response module 630, request transmitter 670, and response receiver 680. Context generator 610 may store service identifiers 612, 614, and 616 (i.e., service identifiers 612-616). Each of service identifiers 612-616 may correspond to a particular remote computing system and may define and/or identify a service account usable by users or software applications associated with the managed network to access the particular remote computing system. Service identifiers 612-616 may also define and/or contain credentials (e.g., username and password, a unique token, etc.) for accessing the corresponding remote computing system by way of the service account.

A context may be specified for a discovery pattern by defining and/or selecting one of service identifiers 612-616. That is, the selected service identifier may indicate at least (i) the specific remote computing system for which discovery application 600 will be used to define a discovery pattern and (ii) the credentials to be used to obtain, from this specific remote computing system, the data used by the discovery pattern. By indicating the specific remote computing system for which the discovery pattern is to be defined, context generator 610 may dictate the manner in which request and response module 630 operates when generating an API request, such that it adheres to the system-invariant rules and the system-specific rules of the specific remote computing system.

User interface 620 may include input fields 622, allow for definition of output variables 624, and allow for specification of response data format 626, among other possibilities. Input fields 622 may include one or more fields that provide for selection and/or definition of a particular one of service identifiers 612-616 to select the context for the discovery pattern. Input fields 622 may also include a URL input field configured to receive as input a URL that addresses a function of the API and/or provides input values therefor. This function may be configured to determine and return attributes of computing resources within the remote computing system undergoing discovery, and provide any other information relevant in the discovery and mapping operations.

The URL may include therein resource path parameters and/or query parameters that specify at least (i) the computing resources for which attributes are requested from the function and (ii) the specific attributes that are requested (e.g., the specific subset of all attributes that the API function is configured to determine). Resource path parameters may be provided as values included in a resource path of the URL, as in http://example.com/example_resource_path/{example_resource_path_parameter_value}, where {example_resource_path_parameter_value} is to be replaced by a specific value (e.g., integer or string). Similarly, query parameters may be provided as key-value pairs appended at an end of the URL (e.g., after the resource path), as in http://example.com/resource_path?{key}={value}, where {key} and {value} are to be replaced by specific values (e.g., resource=load_balancer).

Input fields 622 may also include one or more input fields configured to receive values of other parameters to be provided by discovery application 600 to the API. These other parameters may be provided to the API as transfer protocol parameters (e.g., HTTP parameters), and may specify additional inputs for the API function, indicate characteristics of the transmitted API request, and/or indicate characteristics of the expected API response, among other aspects. Each of these input fields may indicate how the inputs provided thereto are to be included in the API request generated and transmitted by discovery application 600. For example, a respective input field of input fields 622 may be dedicated to specifying HTTP headers for the API request, an HTTP method to be used for transmission of the API request, HTTP cookies to be included with the API request, and contents of an HTTP body of the API request, among other possibilities. Depending on the parameter, input fields 622 may take the form of text input fields, or drop-down boxes from which one of a plurality of pre-defined options may be selected, among other possibilities.

Output variables 624 may be configured to store therein values returned by the API function in response to the API request. Each respective output variable of output variables 624 may indicate at least (i) a variable name of the respective output variable and (ii) a field of the API response (e.g., a name of the field) that contains the value to be assigned to the respective output variable.

Response data format 626 may, in turn, define a manner in which the API response organizes the requested attributes of the computing resources. For example, response data format 626 may indicate that the attributes are arranged as comma-separated values (CSV), a JSON object, an XML object, or another data format. Response data format 626 may thus indicate how the API response is to be parsed by discovery application 600 to identify therein the values to be assigned to output variables 624.

Output variables 624 and response data format 626 may, in some cases, be defined manually based on documentation of a particular API. Alternatively or additionally, output variables 624 and response data format 626 may be defined by discovery application 600 automatically, with little to no manual modification, based on a specification of the API (e.g., an OPENAPI® specification).

Figure 10:
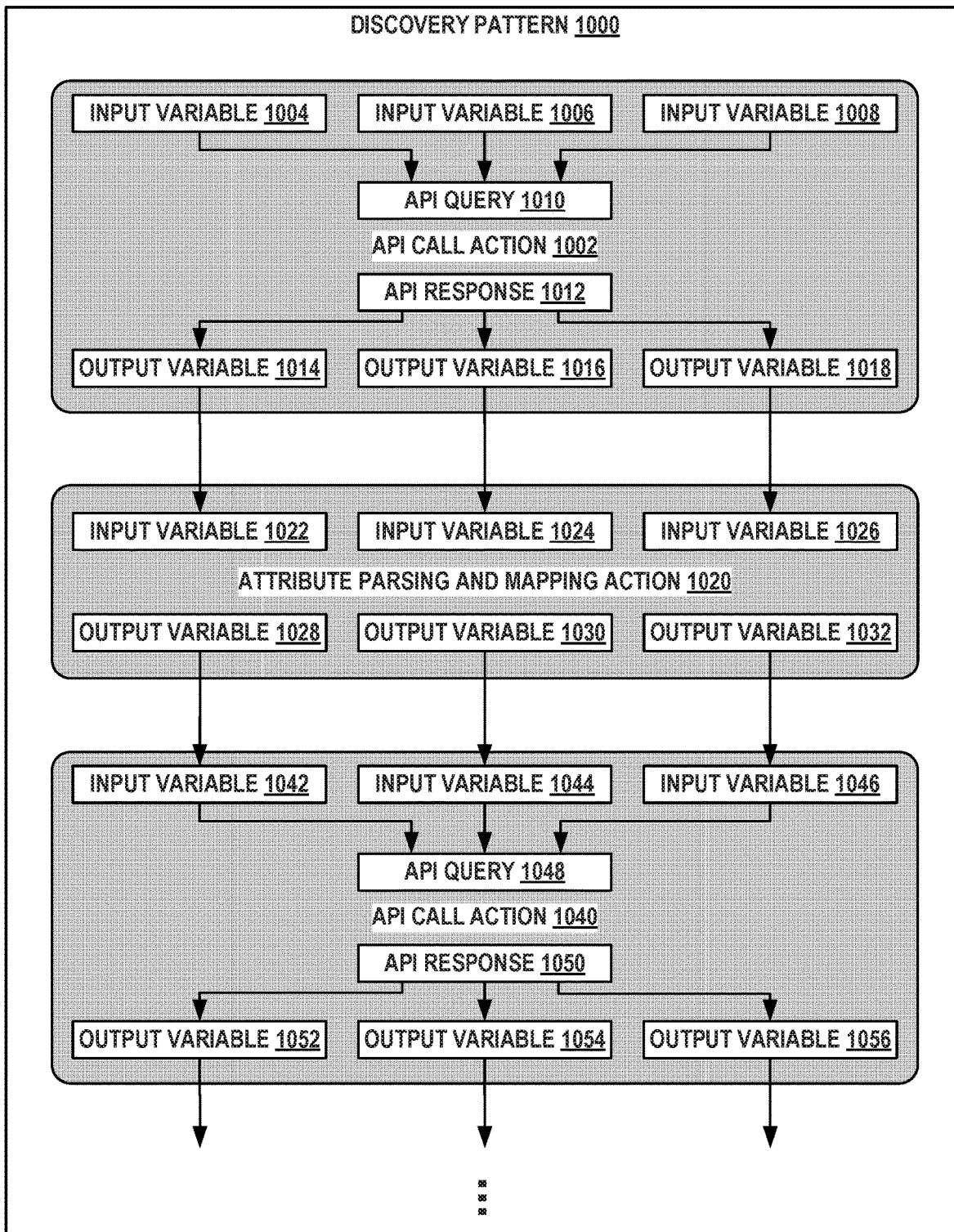
FIG. 10 depicts a discovery pattern, in accordance with example embodiments.

A discovery pattern generated by discovery application 600 may be made up of a plurality of different actions that define the logic of the discovery pattern, as discussed in more detail with respect to FIG. 10. For example, the actions may acquire the data (e.g., the attributes of computing resources) to be used in discovery and mapping, analyze the data to identify therein relationships between the computing resources, generate mappings between the computing resources, and stored these mappings in a CMDB, among other operations. Output variables 624 of each action in the pattern may facilitate the sharing of information among the different actions of the discovery pattern.

Notably, user interface 620 may include other aspects not shown herein that facilitate definition of discovery patterns, as indicated by the ellipsis. These other aspects may include, for example, a visual layout of the actions that make up a discovery pattern and various building blocks (e.g., action templates) for defining the logic of the discovery pattern, among other possibilities.

Request and response module 630 may include system-invariant module 640 and one or more system-specific modules 650-660, as indicated by the ellipsis. System-invariant module 640 may define and execute operations that are common to each of the APIs for which discovery and mapping is supported by discovery application 600. Notably, system-invariant rules and operations may include (i) rules and operations where no variation is permitted by design and/or (ii) rules and operations where variation is permitted, but which are nevertheless uniformly implemented by all supported APIs.

Thus, system-invariant module 640 may include input fields mapper 642, which implements a process for assigning the values provided to input fields 622 to transfer control parameters. For example, the different APIs may be configured to communicate with discovery application 600 by way of HTTP requests. Thus, a value provided in the "HTTP Headers" input field will always be transmitted as an HTTP header parameter, regardless of the API. Similarly, another value provided in the "HTTP Cookies" input field will always be transmitted as an HTTP cookie parameter. In other words, the HTTP protocol might not permit variation in such mapping (e.g., sending a header parameter in the body may be incorrect), making such mapping system-invariant.

System-invariant module 640 may also include response parser 644, which may implement processes for parsing different response data formats 626. Since there may be a finite number of possible response data formats 626, response parser 644 may be configured to support each of these formats. Once a particular response data format is indicated for an API by way of user interface 620, the process for identifying therein output values of the API function is independent of the API. For example, in the case of a CSV response format, the parsing process may involve identifying values delimited by commas, while in the case of a JSON object, the parsing process may involve identifying key-value pairs delimited by curly braces, quotation marks, and colons. Thus, while each response data format may be used to transmit a wide variety of information, the implementation of the format itself does not vary among APIs, thus making response parsing system-invariant.

System-invariant module 640 may also include output variables mapper 646, which may implement a process for mapping portions of the response to output variables 624. That is, output variables mapper 646 may, based on the definition of output variables 624, identify a particular value or key-value pair in the parsed API response and allocate this particular value to a corresponding one of output variables 624. For example, a first output variable (e.g., "user ID") of output variables 624 may indicate that its value is stored in a "userid" field of the response. When the response is formatted as a JSON object, response parser 644 may identify therein the different key-value pairs, including a pair "userid": "12345". Output variables mapper 646 may, in turn, assign the value "12345" to the output variable "user ID." Again, when output variables 624 and response data format 626 are defined, the process of assigning the correct value to each of output variables 624 may be independent of the API.

On the other hand, system-specific modules 650-660 may each define and execute operations that are specific to a corresponding one of the APIs for which discovery and mapping is supported by discovery application 600. Notably, system-specific rules and operations may include any rules or operations that are not common to each of the supported APIs. Implementing such system-specific rules and operations may involve writing additional programmatic code beyond that available in system-invariant module 640 to support at least one aspect of the operation of a particular remote computing system. Such programmatic code may at least in part form a respective one of system-specific modules 650-660.

System-specific module 650 may include provider identifier 652 of the remote computing system corresponding to system-specific module 650. Provider identifier 652 may include a name of a provider of the remote computing system (e.g., AMAZON®, MICROSOFT®, GOOGLE®, IBM®, etc.), a name of a specific service or platform provided by the remote computing system (e.g., AMAZON WEB SERVICES®, MICROSOFT® AZURE®, GOOGLE CLOUD PLATFORM®, IBM CLOUD®, etc.), and/or a unique identifier assigned to the remote computing system, among other possibilities. Regardless of the format, provider identifier 652 may be mapped or otherwise related to a corresponding one or more of service identifiers 612-616. Thus, selection of a particular one of service identifiers 612-616 allows context generator 610 to indicate to request and response module 630 which one of system-specific modules 650-660 is to be used to handle communication with the API of the corresponding remote computing system.

System-specific module 650 may define authentication rules 654 for providing credentials to the API of the corresponding remote computing system. Authentication rules 654 may indicate at least (i) a type of authentication utilized by the corresponding remote computing system and (ii) a manner in which the authentication credentials are to be provided to the API (e.g., in what HTTP parameter). Examples of authentication rules 654 are discussed in more details with respect to FIGS. 7A, 7B, and 7C.

System-specific module 650 may also define pagination rules 656 for obtaining the output of the API function in multiple API responses (e.g., when the output is too large to transmit in a single API response). Examples of pagination rules 656 are discussed in more detail with respect to FIGS. 8A and 8B.

System-specific module 650 may further define resource location rules 658 that allow discovery application 600 to discover and map computing resources that are distributed among multiple different geographic regions (e.g., multiple data centers in different geographic locations) associated with a particular remote computing system. Each of the different remote computing systems may implement (i) a different set of available geographic regions, (ii) a different format for naming the available geographic regions, and/or (iii) a different procedure for obtaining information associated with computing resources in the available geographic regions, among other possible differences.

For example, a first remote computing system may provide a different API and/or a different API function for each geographic region. That is, resources in REGION_1 (e.g., United States East) may be discoverable by transmitting a request to "HTTP://REGION_1.REMOTE_SYSTEM_1/GET_COMPUTING_RESOURCES", while resources in REGION_2 (e.g., United States West) may be discoverable by transmitting a request to "HTTP://REGION_2.REMOTE_SYSTEM_1/GET_COMPUTING_RESOURCES".

Alternatively, a second remote computing system may provide a single API function that provides information indicative of computing resources within multiple geographic regions. Thus, this function of the second remote computing system may request as input an identifier of the specific geographic region for which data (e.g., a listing of the computing resources and their attributes) is requested. An example request may thus be transmitted to "HTTP://REMOTE_SYSTEM_2/REGION_1/GET_COMPUTING_RESOURCES", where the geographic region is specified as a resource path parameter, rather than a subdomain as in the first example. Notably, both approaches may necessitate multiple invocations of the functions to collect information across multiple different geographic regions.

System-specific module 650 may be configured to automatically iterate across any geographic regions in which resources are or may be allocated. That is, the discovery pattern may discover computing resources in multiple geographic regions with a single action, instead of necessitating, for example, one action per geographic region. Discovery application 600 may be configured to receive, parse, and utilize specific syntax that allows system-specific modules 650-660 to automatically iterate API queries over multiple available regions. For example, when a URL used to access a function of the API includes therein designation of a specific geographic region, this designation may be replaced by the string (e.g., flag or identifier) "{REGION}" when the URL is provided as input to discovery application 600 by the pattern designer.

The string "{REGION}" may indicate to discovery application 600 and its respective system-specific module that the API query should be repeated for multiple geographic regions. The string "{REGION}" may therefore be referred to as a region-invariant identifier of multiple geographic regions. Thus, in the example of the first remote computing system, the URL provided to discovery application 600 by the pattern designer may instead read "HTTP://{REGION}.REMOTE_SYSTEM_1/GET_COMPUTING_RESOURCES". Similarly, in the case of the second remote computing system, the URL may read "HTTP://REMOTE_SYSTEM_2/{REGION}/GET_COMPUTING_RESOURCES".

The system-specific modules 650-660 may be configured to, in response to identifying "{REGION}" in the URL provided as input thereto, generate one or more modified URLs where "{REGION}" is replaced by another identifier that designates a specific geographic region. Thus, for example, an input to discovery application 600 of the URL "HTTP://REMOTE_SYSTEM_2/{REGION}/GET_COMPUTING_RESOURCES" may cause discovery application 600 to automatically generate and transmit API requests to "HTTP://REMOTE_SYSTEM_2/REGION_1/GET_COMPUTING_RESOURCES", "HTTP://REMOTE_SYSTEM_2/REGION_2/GET_COMPUTING_RESOURCES", "HTTP://REMOTE_SYSTEM_2/REGION_3/GET_COMPUTING_RESOURCES", and so on until any regions that have and/or may have discoverable computing resources are queried by the discovery pattern. Thus, input of a single URL that does not specify a particular geographic region (but specifies multiple regions in a region-invariant manner) may be used by system-specific modules 650-660 to generate multiple region-specific URLs that each designate and/or query a corresponding geographic region.

In one example, system-specific modules 650-660 may be configured to perform such operations for each geographic region available from the corresponding remote computing system (e.g., when it is not known whether such regions contain computing resources allocated to the managed network). In another example, system-specific modules 650-660 may be configured to perform such operations for each geographic region that contains computing resources allocated to the managed network. In either case, context generator 610 may provide information indicative of (i) geographic regions provided by a particular remote computing system and/or (ii) geographic regions in which computing resources are allocated to the managed network. Thus, each of service identifiers 612-616 may include information associated with performing region-specific queries for the corresponding remote computing system.

System-specific module 660 may similarly include provider identifier 662, authentication rules 664, pagination rules 666, and resource location rules 668. System-specific module 660 is shown in dashed lines to indicate that, in general, while multiple system-specific modules 650-660 are available, one system-specific module is used for a discovery pattern tailored to a particular remote computing system. Thus, system-invariant module 640 and one of system-specific modules 650-660 coordinate to generate the API request for the particular remote computing system and process the API responses received therefrom.

In some implementation, the outputs of system-invariant module 640 and system-specific module 650 may be generated independently and thereafter concatenated to form the API request provided to request transmitter 670, as illustrated in FIG. 6. In other implementations, system-invariant module 640 and the system-specific module may operate sequentially. For example, the output of system-invariant module 640 may be provided to system-specific module 650, which may modify or extend this output to include therein the system-specific aspects of the API request.

Request transmitter 670 may be configured to transmit the API request generated by request and response module 630 to the API. Similarly, response receiver 680 may be configured to receive the API response and provide it to request and response module 630 for analysis. In some implementations, transmitter 670 and receiver 680 may be implemented as part of request and response module 630.

The implementation of discovery application 600 illustrated in FIG. 6 selects a particular one of system-specific modules 650-660 based on the service identifier selected by or from context generator 610. In other implementations, however, the context of a discovery pattern or a single action thereof may be determined based on the URL provided by way of user interface 620. Namely, the URL may be parsed to identify therein an identifier of the specific remote computing system that the URL addresses. Based on this identifier, a corresponding one of service identifiers 612-616 may be selected from context generator 610, which may in turn allow for selection of a corresponding one of system-specific modules 650-660. In this way, each discovery pattern may include actions that invoke the APIs of different remote computing systems, thus allowing for discovery and mapping of any relationships between the different remote computing systems in a single discovery pattern.

VII. Example System-Specific Operations

FIGS. 7A, 7B, and 7C illustrate examples of different authentication rules and procedures that may be used by discovery application 600 when communicating with the APIs of different remote computing systems. Each of FIGS. 7A, 7B, and 7C shows a portion of example HTTP requests having both system-invariant portions and system-specific portions. The system-specific portions are shown bounded by a dashed line against a darkened background to differentiate them from the system-invariant portions, which are shown bounded by a solid line against a white background.

FIG. 7A illustrates a first HTTP GET request to be transmitted to a first remote computing system REMOTE_SYSTEM_1, as indicated by lines 700 and 701. The first request specifies resource path RESOURCE_PATH_1 and query parameter QUERY_PARAM_1 having value VALUE_1, that identify a first API function and provide an input thereto. Notably, these aspects of the first request are generated by system-invariant module 640 since they are not system-specific or API-specific.

The first remote computing system uses basic HTTP authentication, as indicated by line 702. In basic HTTP authentication, the HTTP request contains an HTTP header field of the form Authorization: Basic {credentials}, where {credentials} is a base64 encoding of a log-in userid and password joined by a colon. Thus, as an example, the string "ZXHHBXBSZV91C2VYBMFTZTPLEGFTCGXLX3BHC3N3B3JK" in FIG. 7A is the base64 encoding of "example_username: example_password". Notably, this aspect of the request is generated by one of system-specific modules 650-660 because each system may use a different authentication method, or may impose system-specific procedures when using a particular authentication method.

Similarly, FIG. 7B illustrates a second HTTP GET request to be transmitted to a second remote computing system REMOTE_SYSTEM_2, as indicated by lines 703 and 704. The second request specifies resource path RESOURCE_PATH_2 and query parameter QUERY_PARAM_2 having value VALUE_2, that identify a second API function and provide an input thereto. Again, these aspects of the second request are generated by system-invariant module 640.

The second remote computing system uses bearer HTTP authentication, as indicated by line 705. In bearer HTTP authentication, the HTTP request contains an HTTP header field of the form Authorization: Bearer {token}. The {token} is a string generated by the second remote computing system or a third-party involved in authentication and allows the bearer of this token (i.e., discovery application 600) access to one or more resources (e.g., the API functions). The token may be implemented according to the JSON Web Token (JWT) format and/or used as part of an OAuth 2.0 authentication procedure, among other possibilities. The string "C4DKFOMLBICAWEYJS8DOI1HQIYGQA_AMTAHB75Y24-AWDGWKHAUFEG8K97K6CQA7AKH_BWYAB0IZAD-8CA1PV2OH0KY2WSRGTWBCBPEQESVQ" in lines 706-707 of FIG. 7B is an example token. Again, this aspect of the request is generated by one of system-specific modules 650-660.

FIG. 7C illustrates a third HTTP GET request to be transmitted to a third remote computing system REMOTE_SYSTEM_3, as indicated by lines 708 and 709. The second request specifies resource path RESOURCE_PATH_3 and query parameter QUERY_PARAM_3 having value VALUE_3, that identify a third API function and provide an input thereto. Again, these aspects of the third request are generated by system-invariant module 640.

The third remote computing system uses API keys authentication, as indicated by line 708. In API keys authentication, the URL contains a query parameter that specifies the value of an API key used to access the requested resources. Namely, the URL specifies that API_KEY is assigned value API_KEY_VALUE. Much like the bearer token, the API key may be a string generated by the second remote computing system or a third-party involved in authentication, and may allow the bearer of this token (i.e., discovery application 600) access to one or more resources (e.g., the API functions). In some implementations, each API key may be a universally unique identifier (UUID). Again, this aspect of the request is generated by one of system-specific modules 650-660.

Notably, while the authentication method of a particular system may be based on one or more of a predetermined number of known authentication standards, the implementation of the authentication method by the particular system may include system-specific design choices or deviations from the standards that necessitate system-specific rules.

For example, one remote computing system that uses basic authentication may require that the Authorization: Basic {credentials} header is included with each request transmitted to the API thereof. On the other hand, another remote computing system that uses basic authentication may, after a successful authentication, provide discovery application 600 with an HTTP cookie that represents an active session with the servers thereof. Subsequent API requests may thus omit therefrom the Authentication: Basic {credentials} header for at least a predetermined amount of time, providing instead the HTTP cookie. Accordingly, even where two different remote computing systems use the same authentication method, their specific implementations may differ, thus necessitating system-specific modules 650-660 to facilitate the authentication process.

In another example, multiple different authentication standards or aspects thereof may be combined to form other sets of system-specific authentication rules. Additionally or alternatively, some remote computing systems may implement authentication processes that are not based and do not adhere to standard authentication protocols. Further, some remote computing systems may use a particular authentication procedure to handle both authentication (i.e., verifying an identity of a user or application) and authorization (i.e., determining whether the user or application has access to particular resources). On the other hand, other remote computing system may handle (i.e., have different rules and processes for) authorization differently than authentication. Each of these system-specific differences may be reflected in authentication rules 654-664 and handled by system-specific modules 650-660 such that these differenced need not be manually implemented when a discovery pattern is being defined.

Figure 8A:
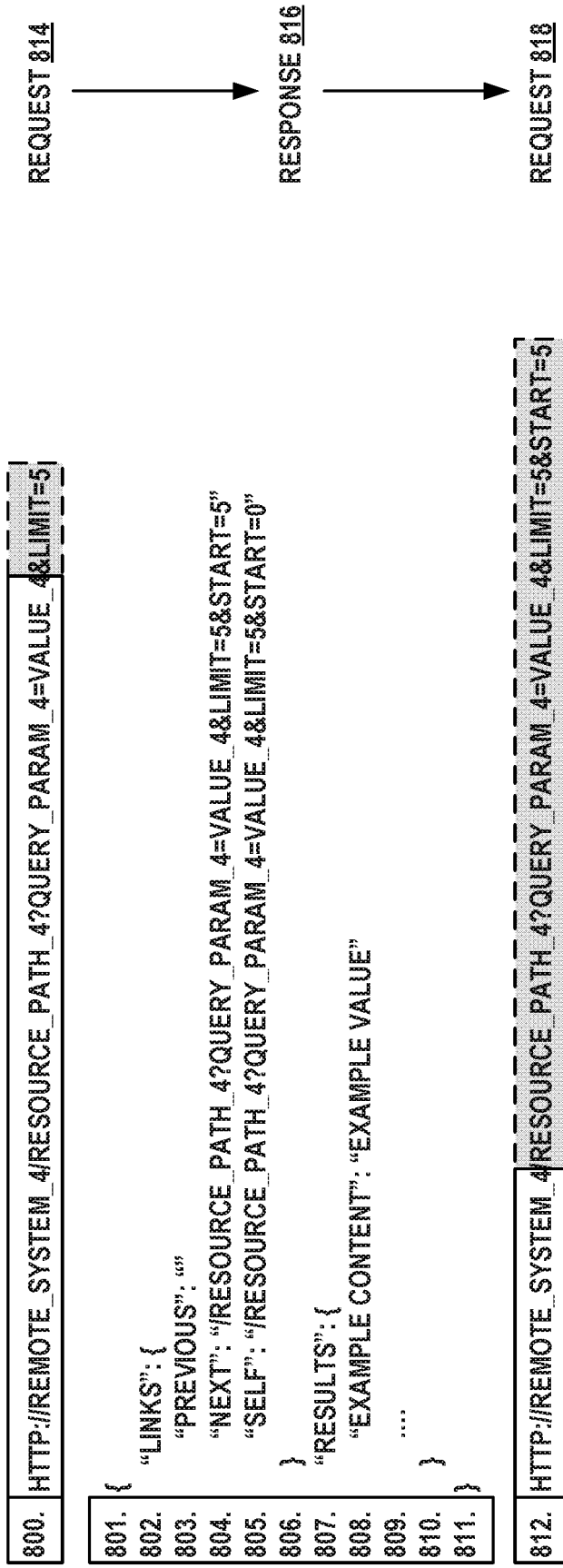
FIGS. 8A and 8B depict requests with pagination parameters, in accordance with example embodiments.
Figure 8B:
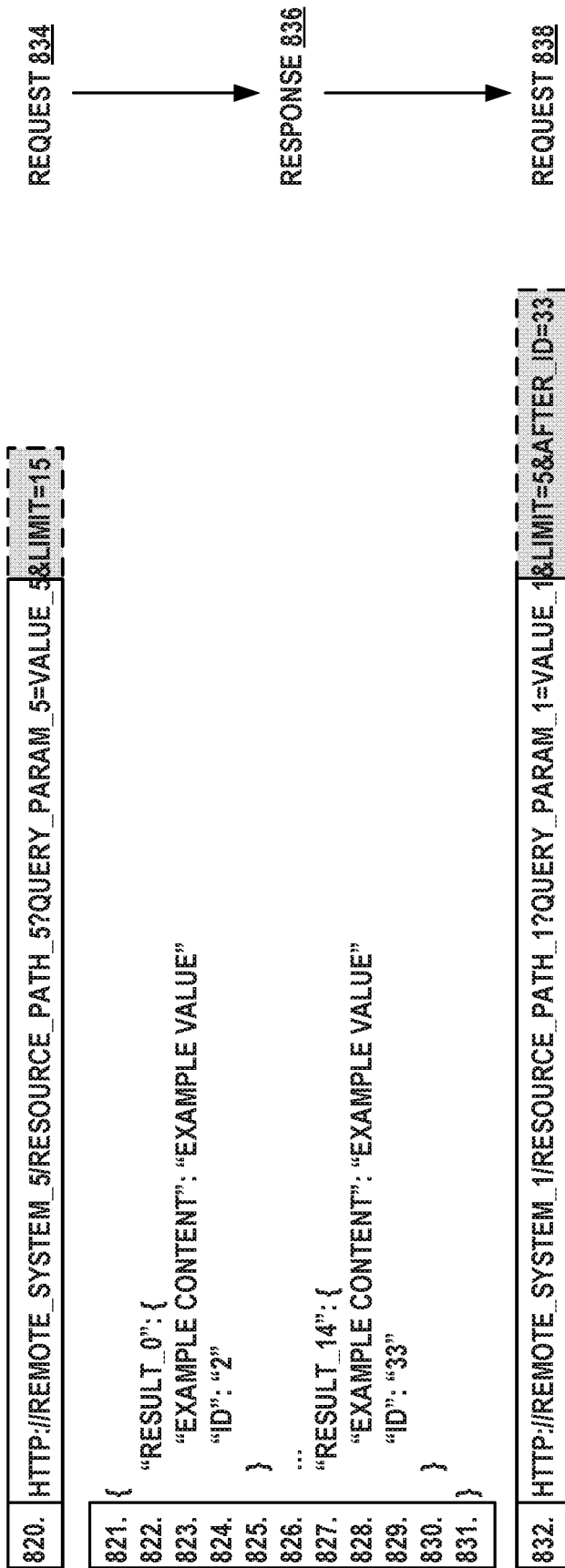

FIGS. 8A and 8B illustrate examples of different pagination rules and procedures that may be used by different remote computing systems to divide API function outputs into multiple HTTP responses. Each of FIGS. 8A and 8B illustrates an initial API request, an API response that includes a first page of output and indicates how subsequent pages are to be obtained, and a subsequent API request to obtain an additional page out the output. The system-specific portions of the URLs used to address the API functions are shown outlined by dashed lines against a darkened background to differentiate them from the system-invariant portions, which are shown outlined with solid lines against a white background.

FIG. 8A illustrates, on line 800, a URL that addresses REMOTE_SYSTEM_4 and defines a portion of API request 814 to be transmitted thereto by discovery application 600. Specifically, this URL specifies an API function and/or provides input thereto byway of resource path RESOURCE_PATH_4 and query parameter QUERY_PARAM_4 having value VALUE_4. The URL on line 800 additionally includes query parameter LIMIT assigned a value of 5, which indicates that each API response is to be limited to a maximum of five results. Thus, when the number of results returned by the API function exceeds 5, these results will have to be provided in multiple different responses, each of which may be referred to as a page.

In response to request 814, the remote computing system may provide API response 816, the contents of which are shown on lines 801-811 (i.e., lines 801, 802, 803, 804, 805, 806, 807, 808, 809, 810, and 811). In this case, the response is a JSON object that includes therein (i) a "LINKS" object (lines 801, 802, 803, 804, 805, and 806) and (ii) a "RESULTS" object (lines 807, 808, 809, and 810). The "RESULTS" object may include therein a total of five different outputs generated by the API function in response to request 814 and indicated by "EXAMPLE CONTENT": "EXAMPLE VALUE" and the ellipsis on lines 808 and 809. The "LINKS" object may include (i) a "PREVIOUS" field that includes a URL portion configured to return the preceding five results generated by the API function, (ii) a "NEXT" filed that includes a URL portion configured to return the subsequent five results generated by the API function, and (iii) a "SELF" field that includes a URL portion used to obtain the current set of results (i.e., lines 807-810).

The previous, next, and self URL portions handle pagination by including therein the "LIMIT" parameter that defines the maximum number of results per response and a "START" parameter that defines the starting point in the output from which to provide the results. When response 816 contains the first page of the output, as shown in FIG. 8A, the "PREVIOUS" field may be empty. Similarly, when the response contains the last page of the output, the "NEXT" field may be empty. In the example of FIG. 8A, when generating the previous, next, and self URL portions, the API function may be configured to use the same limit as specified in request 814 (i.e., 5). In cases where request 814 omits to specify the limit or specifies an invalid limit (e.g., too many results to fit in one response due to maximum response size limit), the API function may use a default limit value (e.g., 5, 10, 15, 50, etc.).

Based on or in response to receiving response 816, one of system-specific modules 650-660 may be configured to identify therein the previous, next, and/or self URL portions and obtain additional pages of results. Thus, as indicated on line 812, request 818 may be generated that includes (i) the base URL portion "HTTP://REMOTE_SYSTEM_4" that specifies the remote computing system to which the request is directed and (ii) the next URL portion "/RESOURCE_PATH_4?QUERY_PARAM_4=VALUE_4&LIMIT=5&START=5" that specifies the next page of results responsive to initial request 814.

Notably, the system-specific module may be configured to automatically obtain the subsequent page, as well as any other remaining pages, without the discovery pattern or the actions thereof having to implement any pagination logic. In other words, a discovery pattern designer may define a discovery pattern without needing to account for the specific manner in which a particular remote computing system handles pagination.

FIG. 8B illustrates another pagination method that may be employed by a different remote computing system. Specifically, FIG. 8B illustrates, on line 820, a URL that addresses REMOTE_SYSTEM_5 and defines a portion of request 834 to be transmitted thereto. Specifically, this URL specifies an API function and/or provides input thereto by way of resource path RESOURCE_PATH_5 and query parameter QUERY_PARAM_5 having value VALUE_5. The URL on line 820 additionally includes query parameter LIMIT assigned a value of 15, which indicates that each API response is to be limited to a maximum of 15 results. Thus, when the number of results returned by the API function exceeds 15, these results will have to be provided in multiple different responses (i.e., pages).

In response to request 834, the remote computing system may provide response 836, the contents of which are shown on lines 821-831 (i.e., lines 821, 822, 823, 824, 825, 826, 827, 828, 829, 830, and 831). In this case, the response is a JSON object that includes therein a "RESULT_0" object (lines 822, 823, 824, and 825) through a "RESULTS_14" object (lines 827, 828. 829, and 830), making for a total of 15 results, as specified by request 834. Each "results" object may include therein an "ID" field associated with a corresponding value that represents a unique identifier of the corresponding result. Pagination may thus be carried out using the "ID" field as a way to divide the output of the API function into multiple pages.

Namely, the system-specific module of this remote computing system may handle pagination by including in a subsequent URL the "LIMIT" parameter that defines the maximum number of results per response and an "AFTER_ID" parameter that defines the "ID" of the last received result, and thus indicates the starting point in the output from which to provide the results. In one example, each of the possible results of the API function may be stored in a database in order according to the corresponding "ID" value. In another example, each of the possible results of the API function may be stored in the database in an unsorted fashion, but may be sorted by the API function, thus resulting in output sorted according to "ID."

Based on or in response to receiving response 836, the system-specific module may be configured to identify therein the "ID" value of the last result (i.e., 33) and attempt to obtain additional pages of results. Thus, request 838 may be generated that is generally the same as the URL on line 820, but includes therein the parameter "AFTER_ID" having value "33," as indicated on line 832. In response to request 838, the API function may return the next 15 results that meet the parameters of the query, specifying the "ID" associated with each result to allow for any remaining results to be obtained in yet further responses.

While response 816 in FIG. 8A provides an intuitive indication of pagination, response 836 does not. Thus, if pagination were to be handled by a pattern designer not familiar with the system-specific rules of REMOTE_SYSTEM_5, the pattern designer might erroneously assume that response 836 contains a complete response to request 834, since response 836 provides no explicit indicia of pagination. This would result in the discovery pattern omitting discovery of a portion of the computing resources and their attributes. Accordingly, inclusion of pagination rules in the system-specific modules allows for more accurate discovery patterns, in addition to simplifying the patterns themselves and the process of defining them.

VIII. Example Discovery Patterns and Operations

Figure 9:
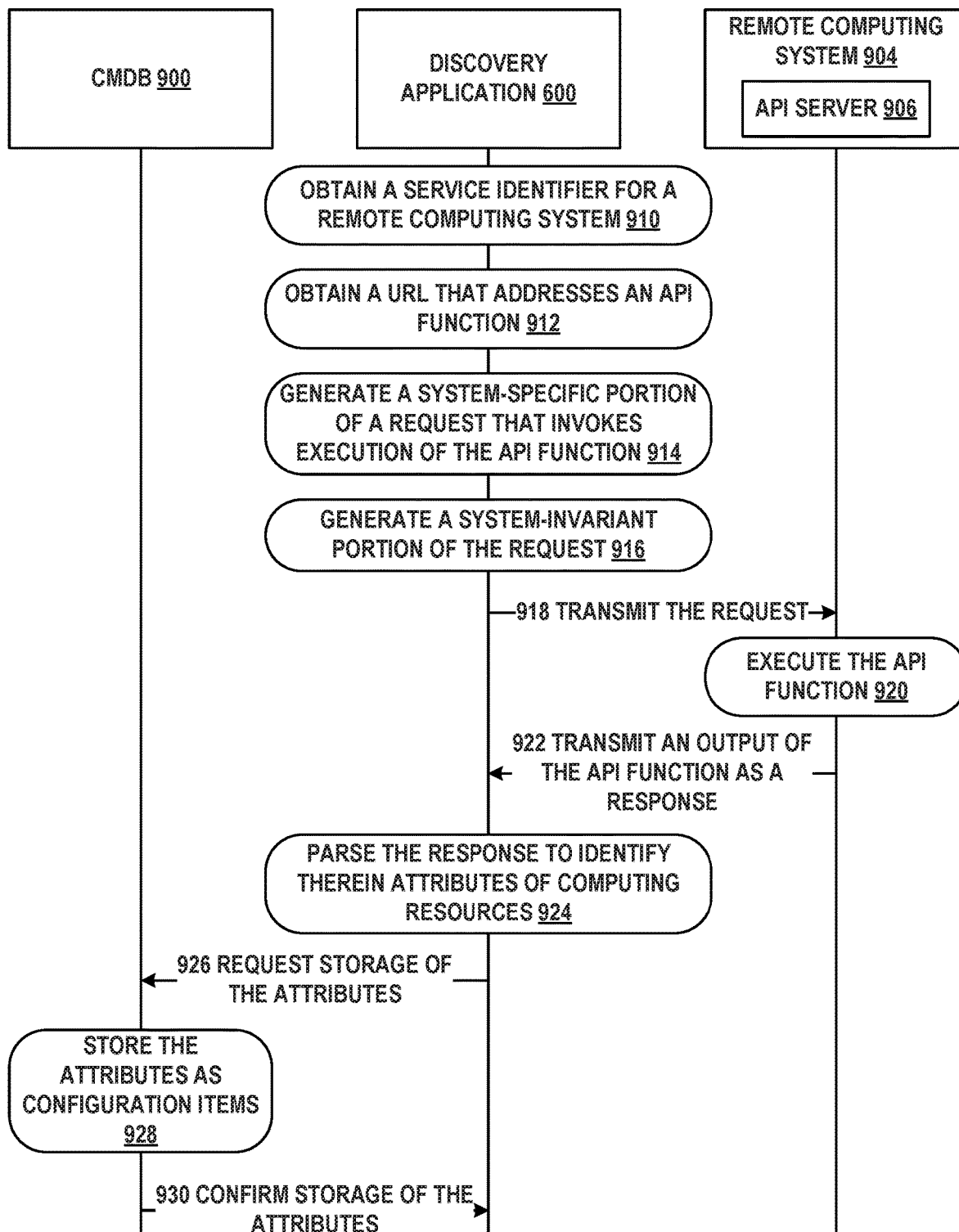
FIG. 9 is a message diagram, in accordance with example embodiments.

FIG. 9 depicts a message diagram that illustrates how discovery application 600 operates together with CMDB 900 and remote computing system 904 to discover and map aspects of remote computing system 904. Discovery application 600 and CMDB 900 may be disposed in and/or hosted by managed network 300 or remote network management platform 320 (e.g., computational instance 322), or may be distributed therebetween. Remote computing system 904 may provide API server 906 that hosts the API and executes the functions thereof.

Discovery application 600 may be configured to obtain a service identifier for a remote computing system, as indicated by block 910. The service identifier may be obtained based on or in response to input received by way of the user interface of discovery application 600. For example, the input may represent a selection of one or service identifiers 612-616 provided by context generator 610. The obtained service identifier may specify remote computing system 904 as the system for which discovery and mapping are to be executed.

Based on or in response to obtaining the service identifier at block 910, discovery application 600 may be configured to obtain a URL that addresses an API function provided by API server 906, as indicated by block 912. The URL may include therein URL resource path parameters (e.g., /resourcepath/{resurce_path_parameter_value}) and URL query parameters (e.g., {query_parameter_key}={query_parameter_value}) that specify the API function and various input values therefor. In some cases, discovery application 600 may also obtain additional input values that define aspects of the request, provide additional inputs, and/or define aspects of the response, among other possibilities. These additional input values may be provided to the API as various HTTP parameters (e.g., headers, body, cookies, method, etc.).

Based on or in response to obtaining the URL at block 912, the discovery application may be configured to generate a system-specific portion of a request that invokes execution of the API function, as indicated by block 914. The system-specific portion of the request may be generated by one of system-specific modules 650-660, and may adhere to system-specific rules that define how API server 906 handles authentication, pagination, and/or other system-specific API operations.

Based on or in response to obtaining the URL at block 912, the discovery application may also be configured to generate a system-invariant portion of the request, as indicated by block 916. The system-invariant portion of the request may be generated by system-invariant module 640, and may adhere to rules shared by each of a plurality of different remote computing systems, including API server 906 of remote computing system 904.

Based on or in response to generating the request at blocks 914 and 916, discovery application 600 may be configured to transmit the request to API server 906, as indicated by arrow 918. The request may be an HTTP request or a request transmitted by way of another transfer protocol. Based on or in response to reception of the request at arrow 918, API server 906 may be configured to execute the API function according to the parameters contained in the request, as indicate by block 920. Based on or in response to execution of the API function at block 920, API server 906 may be configured to transmit, to discovery application 600, an output of the API function as a response (e.g., an HTTP response), as indicated by arrow 922.

Based on or in response to reception of the response at arrow 922, discovery application 600 may be configured to parse the response to identify therein attributes of computing resources provided by remote computing system 904, as indicated by block 924. The request generated and transmitted by discovery application 600 at arrow 918 may specify the computing resources for which the API function is to determine and provide the attributes. Thus, discovery application 600 may define the scope of discovery by way of the parameters provided to API server 906 as part of the request at arrow 918.

Based on or in response to identifying the attributes in the response at block 924, discovery application 600 may be configured to request storage of the attributes in CMDB 900 as one or more configuration items. Discovery application 600 may additionally determine relationships among the computing devices based on their attributes and generate a mapping between the computing devices. This mapping may also be stored in CMDB 900 as configuration items.

Based on or in response to reception of the request at arrow 926, CMDB 900 may be configured to store the attributes and/or the mapping as configuration items, as indicated by block 928. Based on or in response to storage of the configuration items at block 928, CMDB 900 may be configured to transmit, to discovery application 600, confirmation of storage of the attributes, as indicated by arrow 930. The configuration items may be retrieved from CMDB 900 and used to generate a visual representation of the computing resources and the relationships therebetween.

Notably, in some implementations, discovery application 600 may repeat operations 912-924, repeat aspects thereof, and/or perform other operations as part of a discovery pattern before storing the results as configuration items at arrow 926. For example, discovery application 600 may repeat operations 912-924 for a plurality of different API functions to gather the attributes of a plurality of different types of computing resources within a remote computing system. Discovery application 600 may then process these attributes to determine how these different computing resources relate to one another. Each of these operations may be implemented as a separate action of a discovery pattern, thus making the discovery pattern modular and allowing for easy modification of subsets thereof.

FIG. 10 illustrates an example discovery pattern 1000 made up of a plurality of actions 1002, 1020, and 1040. Each of actions 1002, 1020, and 1040 (as well as other actions not shown in FIG. 10) implement a portion of the operations involved in discovering and mapping the computing resources assigned to a managed network. Actions 1002, 1020, and 1040 are interconnected such that the output of one action may be provided as input to one or more other actions to allow for coordination among actions and modularization of the discovery pattern.

Action 1002 may be an API call action (i.e., an action that calls an API function) configured to obtain from a particular remote computing system data that identifies (i) a subset of computing resources assigned to a particular managed network and (ii) the attributes of these computing resources. API call action 1002 may, for example, obtain (i) a list of all virtual machines in the remote computing system assigned to the managed network and (ii) the attributes of these virtual machines (e.g., the data centers in which they are hosted, their IP addresses, etc.).

To that end, API call action 1002 may be configured to receive as input values for input variables 1004, 1006, and 1008. The values for input variables 1004, 1006, and 1008 may be received, for example, by way of input fields 622 of user interface 620 of discovery application 600, from context generator 610, or from other discovery patterns, among other possibilities. Based on the values of input variables 1004, 1006, and 1008, discovery application 600 may be configured to generate API query 1010 (i.e., an API request) and transmit this query to the API. In response, discovery application 600 may be configured to receive API response 1012, which may be parsed to identify therein output values of the API function. These output values may, in turn, be assigned to output variables 1014, 1016, and 1018. Notably, output variables 1014, 1016, and 1018 may represent a subset of output variables 624 defined by way of user interface 620. The mapping between API response 1012 and output variables 1014, 1016, and 1018 may be carried out by output variables mapper 646 of system-invariant module 640.

Output variables 1014, 1016, and 1018 may be mapped or connected to input variables 1022, 1024, and 1026, respectively, of action 1020 of discovery pattern 1000. Action 1020 may be, for example, an attribute parsing and mapping action configured to, among other functions, identify, based on the attributes obtained by action 1002, other computing resources that are utilized by or otherwise related to the virtual machines discovered by action 1002. For example, attribute parsing and mapping action 1020 may identify load balancers that distribute web traffic among the virtual machines, storage volumes utilized by the virtual machines, and/or network infrastructure components that the virtual machines utilize. Identifiers of these additional computing resources may be stored in output variables and passed to subsequent actions that obtain attributes thereof from other APIs of the remote computing system.

For example, identifiers of storage volumes may be stored in output variables 1028, 1030, and 1032 which are passed to input variables 1042, 1044, and 1046 of another API call action 1040. Identifiers of load balancers may be stored in other output variables not shown herein and passed to input variables of another action not shown herein. Output variable 1028 may, for example, store a list of the storage volumes to be discovered, output variables 1030 may store a list of data centers in which the storage volumes are expected to be located, and variable 1032 may store additional attributes discovered by action 1002 that may be relevant in discovering the storage volumes. Input variables 1042, 044, and 1046 may correspond to one or more of input fields 622 but, in this case, may receive their respective inputs automatically from another action, rather than manually from a user.

API call action 1040 may generate API query 1048 based on input variables 1042, 1044, and 1046, transmit this query to the API, and receive therefrom API response 1050. From API response 1050, action 1040 may extract the values of output variables 1052, 1054, and 1056, which may be passed as inputs to subsequent actions in discovery pattern 1000, not shown.

Each action of discovery pattern 1000 may, when communicating with the API of a particular remote computing system, automatically adhere to both the system-invariant rules and the system-specific rules when generating the API queries. Notably, in the absence of system-specific modules 650-660, discovery pattern 1000 might have to manually handle system-specific rules of the remote computing systems by, for example, implementing additional actions.

For example, in the absence of pagination support by system-specific modules 650-660, discovery pattern 1000 may include an additional action that reviews each API response to determine whether additional pages of results are available and, if so, re-executes an action that invokes the API function to obtain the remainder of the information. In another example, in the absence of authentication support by system-specific modules 650-660, each action may have to be defined to manually include therein any credentials needed to access the API. In such implementations, each pattern designer may need to be familiar with each of the system-specific rules to properly implement discovery pattern 1000 to adhere to these rules. Through the use of system-specific modules 650-660, however, system-specific rules are automatically implemented by discovery application 600, without discovery pattern 1000 needing to include therein actions or logic that explicitly accommodate the system-specific rules.

Discovery pattern 1000 or aspects thereof may be executed according to a discovery schedule. The discovery schedule may indicate specific times at which discovery pattern 1000 or a subset thereof is to be executed and/or specific trigger events that cause discovery pattern 1000 or the subset thereof to be executed. For example, the discovery schedule may indicate to execute discovery pattern 1000 daily, weekly, or monthly.

In another example, the discovery schedule may indicate to execute discovery pattern 1000 when the corresponding remote computing system provides a notification indicating a change or modification in the computing resources assigned to the managed network, or the attributed thereof. In some implementations, when the notification indicates the computing resource that was modified, rather than executing all of discovery pattern 1000, a subset thereof may be executed. For example, then a new virtual machine is dedicated to the managed network, actions 1002 and 1020 which are focused on discovering virtual machines may be executed, while subsequent actions focused on discovery of other types of computing resources might not need to be executed.

IX. Additional Example Operations

Figure 11:
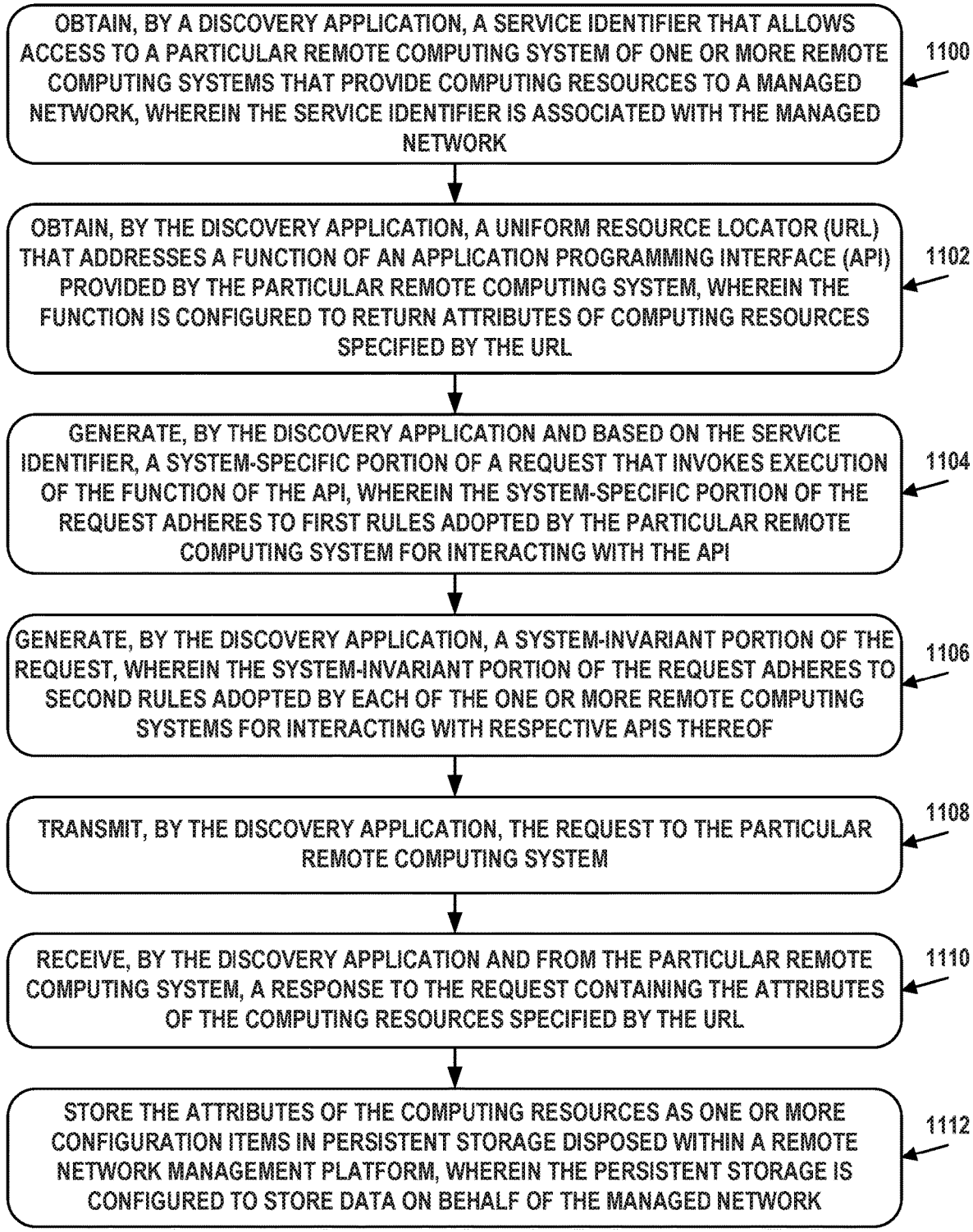
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 involves obtaining, by a discovery application, a service identifier that allows access to a particular remote computing system of one or more remote computing systems that provide computing resources to a managed network. The service identifier may be associated with the managed network.

Block 1102 involves obtaining, by the discovery application, a URL that addresses a function of an API provided by the particular remote computing system. The function may be configured to return attributes of computing resources specified by the URL.

Block 1104 involves generating, by the discovery application and based on the service identifier, a system-specific portion of a request that invokes execution of the function of the API. The system-specific portion of the request may adhere to first rules adopted by the particular remote computing system for interacting with the API.

Block 1106 involves generating, by the discovery application, a system-invariant portion of the request. The system-invariant portion of the request may adhere to second rules adopted by each of the one or more remote computing systems for interacting with respective APIs thereof.

Block 1108 involves transmitting, by the discovery application, the request to the particular remote computing system.

Block 1110 involves receiving, by the discovery application and from the particular remote computing system, a response to the request containing the attributes of the computing resources specified by the URL.

Block 1112 involves storing the attributes of the computing resources as one or more configuration items in persistent storage disposed within a remote network management platform. The persistent storage may be configured to store data on behalf of the managed network.

In some embodiments, the first rules may define an authentication process to be followed in order to access the function of the API.

In some embodiments, the discovery application may receive authentication credentials for the service identifier associated with the particular remote computing system. The discovery application may also store the authentication credentials as part of a representation of the service identifier. The discovery application may additionally generate the system-specific portion of the request by generating a representation of the authentication credentials according to the authentication process.

In some embodiments, the first rules may define a pagination process for obtaining, in multiple responses, the attributes when a size of data representing the attributes exceeds a maximum allowable size of the response to the request. The discovery application may receive, from the particular remote computing system, an indication that the size of the data exceeds the maximum allowable size of the response to the request. The discovery application may also generate a second request to obtain a portion of a remainder of the data according to the pagination process. The discovery application may additionally transmit the second request to the particular remote computing system and receive, from the particular remote computing system, a second response to the second request containing the portion of the remainder of the data.

In some embodiments, the particular remote computing system may include a plurality of geographic regions across which the computing resources provided to the managed network are distributed. The first rules may define a process for iterating over the plurality of geographic regions to obtaining the attributes of the computing resources provided to the managed network.

In some embodiments, the URL may contain therein a region-invariant identifier of the plurality of geographic regions. Generating the system-specific portion of the request may involve replacing the region-invariant identifier in the URL with a region-specific identifier that corresponds to a specific geographic region of the plurality of geographic regions. The discovery application may be configured to generate additional requests that iterate over remaining geographical regions of the plurality of geographical regions to obtain the attributes of the computing resources provided to the managed network.

In some embodiments, the second rules may define a mapping between (i) input fields of a user interface provided by the discovery application for receiving values of corresponding input parameters for the function and (ii) transfer protocol parameters of the request.

In some embodiments, the transfer protocol may be HTTP. The discovery application may receive values of the input parameters for the function by way of the corresponding input fields of the user interface. The discovery application may also generate the system-invariant portion of the request by generating an HTTP request that contains, within HTTP parameters therein, the values of the input parameters according to the mapping.

In some embodiments, the HTTP parameters may include one or more of (i) HTTP headers, (ii) an HTTP method, (iii) HTTP cookies, or (iv) HTTP body parameters.

In some embodiments, the response may contain therein a plurality of values. Each value of the plurality of values may represent a corresponding attribute of the attributes of the computing resources. The discovery application may define a plurality of variables to store the plurality of values and obtain a mapping between the plurality of variables and the plurality of values. In response to receiving the response to the request, the discovery application may assign the plurality of values to the plurality of variables according to the mapping. The discovery application may additionally define an action of a discovery pattern. The action may (i) receive the plurality of variables as input, (ii) determine relationships between the computing resources based on the plurality of variables, and (iii) store, in the persistent storage, representations of the relationships as one or more additional configuration items.

In some embodiments, the plurality of values may be stored in the response according to one or more data formats. The second rules may define one or more processes for parsing the response according to the one or more data formats to identify therein the plurality of values.

In some embodiments, the discovery application may obtain a discovery schedule that defines a condition for re-transmitting the request to the particular remote computing system to obtain an updated version of the attributes. The condition may be at least one of (i) an indication of one or more times at which the request is to be re-transmitted or (ii) reception from the particular remote computing system of a notification of an event that indicates a modification to one or more of the attributes. The discovery application may also determine that the condition has been met and, in response, re-transmit the request to the particular remote computing system. The discovery application may receive, from the particular remote computing system, another response to the re-transmitted request containing an updated version of the attributes. The updated version of the attributes may be stored in the persistent storage by updating the one or more configuration items.

In some embodiments, the computing resources may be specified by the URL by way of one or more of (i) a URL resource path parameter that identifies a specific resource provided by a server device that hosts the API or (ii) a URL query parameter comprising a key and value pair.

In some embodiments, the first rules may differ from corresponding other rules adopted by other remote computing systems of the one or more remote computing systems.

In some embodiments, the one or more remote computing systems may provide one or more corresponding cloud-based computing environments configured to allocate the computing resources based on demand therefor. The computing resources may include one or more of (i) a virtual machine, (ii) a load balancer, (iii) a storage volume, or (iv) network infrastructure.

X. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:
1. A system comprising:
persistent storage disposed within a remote network management platform, wherein the persistent storage is configured to store data on behalf of a managed network, and wherein one or more remote computing systems provide computing resources to the managed network; and
a discovery application configured to perform operations comprising:
obtaining a service identifier that allows access to a particular remote computing system of the one or more remote computing systems, wherein the service identifier is associated with the managed network;

obtaining a uniform resource locator (URL) that addresses a function of an application programming interface (API) provided by the particular remote computing system, wherein the function is configured to return attributes of computing resources specified by the URL;

generating, based on the service identifier, a system-specific portion of a request that invokes execution of the function of the API, wherein the system-specific portion of the request adheres to first rules adopted by the particular remote computing system for interacting with the API, wherein the first rules define a pagination process for obtaining, in multiple responses, the attributes when a size of data representing the attributes exceeds a maximum allowable size of a single response to the request, and wherein the operations further comprise receiving, from the particular remote computing system, an indication that the size of the data exceeds the maximum allowable size of the response to the request, and generating a second request to obtain a portion of a remainder of the data according to the pagination process;

generating a system-invariant portion of the request, wherein the system-invariant portion of the request adheres to second rules adopted by each of the one or more remote computing systems for interacting with respective APIs thereof, wherein the second rules define a mapping between (i) input fields of a user interface provided by the discovery application for receiving values of corresponding input parameters for the function and (ii) transfer protocol parameters of the request, wherein the transfer protocol is Hypertext Transfer Protocol (HTTP), and wherein the operations further comprise generating the system-invariant portion of the request by generating an HTTP request that contains, within HTTP parameters therein, the values of the input parameters according to the mapping;

transmitting the request to the particular remote computing system;

receiving, from the particular remote computing system, a response to the request containing the attributes of the computing resources specified by the URL; and storing, in the persistent storage, the attributes of the computing resources as one or more configuration items.

2. The system of claim 1, wherein the first rules define an authentication process to be followed in order to access the function of the API.

3. The system of claim 2, wherein the operations further comprise:

receiving authentication credentials for the service identifier associated with the particular remote computing system;

storing the authentication credentials as part of a representation of the service identifier; and generating the system-specific portion of the request by generating a representation of the authentication credentials according to the authentication process.

4. The system of claim 1, wherein the operations further comprise:

transmitting the second request to the particular remote computing system; and receiving, from the particular remote computing system, a second response to the second request containing the portion of the remainder of the data.

5. The system of claim 1, wherein the particular remote computing system comprises a plurality of geographic regions across which the computing resources provided to the managed network are distributed, and wherein the first rules define a process for iterating over the plurality of geographic regions to obtaining the attributes of the computing resources provided to the managed network.

6. The system of claim 5, wherein the URL contains therein a region-invariant identifier of the plurality of geographic regions, wherein generating the system-specific portion of the request comprises replacing the region-invariant identifier in the URL with a region-specific identifier that corresponds to a specific geographic region of the plurality of geographic regions, and wherein the operations further comprise:

generating additional requests that iterate over remaining geographical regions of the plurality of geographical regions to obtain the attributes of the computing resources provided to the managed network.

7. The system of claim 1, wherein the operations further comprise:

receiving values of the corresponding input parameters for the function by way of the input fields of the user interface.

8. The system of claim 7, wherein the HTTP parameters comprise one or more of (i) HTTP headers, (ii) an HTTP method, (iii) HTTP cookies, or (iv) HTTP body parameters.

9. The system of claim 1, wherein the response contains therein a plurality of values, wherein each value of the plurality of values represents a corresponding attribute of the attributes of the computing resources, and wherein the operations further comprise:

defining a plurality of variables to store the plurality of values;

obtaining a mapping between the plurality of variables and the plurality of values;

in response to receiving the response to the request, assigning the plurality of values to the plurality of variables according to the mapping; and defining an action of a discovery pattern, wherein the action (i) receives the plurality of variables as input, (ii) determines relationships between the computing resources based on the plurality of variables, and (iii) stores, in the persistent storage, representations of the relationships as one or more additional configuration items.

10. The system of claim 9, wherein the plurality of values are stored in the response according to one or more data formats, and wherein the second rules define one or more processes for parsing the response according to the one or more data formats to identify therein the plurality of values.

11. The system of claim 1, wherein the operations further comprise:

obtaining a discovery schedule that defines a condition for re-transmitting the request to the particular remote computing system to obtain an updated version of the attributes, wherein the condition comprise at least one of (i) an indication of one or more times at which the request is to be re-transmitted or (ii) reception from the particular remote computing system of a notification of an event that indicates a modification to one or more of the attributes;

determining that the condition has been met;

in response to the condition being met, re-transmitting the request to the particular remote computing system;
receiving, from the particular remote computing system, another response to the re-transmitted request containing an updated version of the attributes; and
storing, in the persistent storage, the updated version of the attributes by updating the one or more configuration items.

12. The system of claim 1, wherein the computing resources are specified by the URL by way of one or more of (i) a URL resource path parameter that identifies a specific resource provided by a server device that hosts the API or (ii) a URL query parameter comprising a key and value pair.

13. The system of claim 1, wherein the first rules differ from corresponding other rules adopted by other remote computing systems of the one or more remote computing systems.

14. The system of claim 1, wherein the one or more remote computing systems provide one or more corresponding cloud-based computing environments configured to allocate the computing resources based on demand therefor, and wherein the computing resources comprise one or more of (i) a virtual machine, (ii) a load balancer, (iii) a storage volume, or (iv) network infrastructure.

15. A computer-implemented method comprising:
obtaining, by a discovery application, a service identifier that allows access to a particular remote computing system of one or more remote computing systems that provide computing resources to a managed network, wherein the service identifier is associated with the managed network;
obtaining, by the discovery application, a uniform resource locator (URL) that addresses a function of an application programming interface (API) provided by the particular remote computing system, wherein the function is configured to return attributes of computing resources specified by the URL;
generating, by the discovery application and based on the service identifier, a system-specific portion of a request that invokes execution of the function of the API, wherein the system-specific portion of the request adheres to first rules adopted by the particular remote computing system for interacting with the API, wherein the first rules define a pagination process for obtaining, in multiple responses, the attributes when a size of data representing the attributes exceeds a maximum allowable size of a single response to the request, and receiving, from the particular remote computing system, an indication that the size of the data exceeds the maximum allowable size of the response to the request, and generating a second request to obtain a portion of a remainder of the data according to the pagination process;
generating, by the discovery application, a system-invariant portion of the request, wherein the system-invariant portion of the request adheres to second rules adopted by each of the one or more remote computing systems for interacting with respective APIs thereof, wherein the second rules define a mapping between (i) input fields of a user interface provided by the discovery application for receiving values of corresponding input parameters for the function and (ii) transfer protocol parameters of the request, wherein the transfer protocol is Hypertext Transfer Protocol (HTTP), and generating the system-invariant portion of the request by generating an HTTP request that contains, within HTTP parameters therein, the values of the input parameters according to the mapping;
transmitting, by the discovery application, the request to the particular remote computing system;
receiving, by the discovery application and from the particular remote computing system, a response to the request containing the attributes of the computing resources specified by the URL; and
storing the attributes of the computing resources as one or more configuration items in persistent storage disposed within a remote network management platform, wherein the persistent storage is configured to store data on behalf of the managed network.

16. The computer-implemented method of claim 15, wherein the first rules define an authentication process to be followed in order to access the function of the API.

17. The computer-implemented method of claim 16, further comprising:
receiving authentication credentials for the service identifier associated with the particular remote computing system;
storing the authentication credentials as part of a representation of the service identifier; and
generating the system-specific portion of the request by generating a representation of the authentication credentials according to the authentication process.

18. An article of manufacture including a non-transitory computer-readable medium, having stored thereon program instructions that, upon execution by a computing system, cause the computing system to perform operations comprising:
obtaining a service identifier that allows access to a particular remote computing system of one or more remote computing systems that provide computing resources to a managed network, wherein the service identifier is associated with the managed network;
obtaining a uniform resource locator (URL) that addresses a function of an application programming interface (API) provided by the particular remote computing system, wherein the function is configured to return attributes of computing resources specified by the URL;
generating, based on the service identifier, a system-specific portion of a request that invokes execution of the function of the API, wherein the system-specific portion of the request adheres to first rules adopted by the particular remote computing system for interacting with the API, wherein the first rules define a pagination process for obtaining, in multiple responses, the attributes when a size of data representing the attributes exceeds a maximum allowable size of a single response to the request, and wherein the operations further comprise receiving, from the particular remote computing system, an indication that the size of the data exceeds the maximum allowable size of the response to the request, and generating a second request to obtain a portion of a remainder of the data according to the pagination process;
generating a system-invariant portion of the request, wherein the system-invariant portion of the request adheres to second rules adopted by each of the one or more remote computing systems for interacting with respective APIs thereof, wherein the second rules define a mapping between (i) input fields of a user interface provided by a discovery application for receiving values of corresponding input parameters for the function and (ii) transfer protocol parameters of the request, wherein the transfer protocol is Hypertext Transfer Protocol (HTTP), and wherein the operations further comprise generating the system-invariant portion of the request by generating an HTTP request that contains, within HTTP parameters therein, the values of the input parameters according to the mapping;

transmitting the request to the particular remote computing system;

receiving, from the particular remote computing system, a response to the request containing the attributes of the computing resources specified by the URL; and storing the attributes of the computing resources as one or more configuration items in persistent storage disposed within a remote network management platform, wherein the persistent storage is configured to store data on behalf of the managed network.

\* \* \* \* \*